United States Patent
Grappin et al.

(10) Patent No.: US 12,451,121 B2
(45) Date of Patent: Oct. 21, 2025

(54) SYSTEM AND METHOD FOR TRANSLATION OF STREAMING ENCRYPTED CONTENT

(71) Applicant: COMMUNAUTE WOOPEN INC., Montreal (CA)

(72) Inventors: Edwin Grappin, Seville (ES); Jerome Verdier, Montreal (CA)

(73) Assignee: COMMUNAUTE WOOPEN INC., Montreal (CA)

(*) Notice: Subject to any disclaimer, the term of this patent is extended or adjusted under 35 U.S.C. 154(b) by 107 days.

(21) Appl. No.: 18/282,112

(22) PCT Filed: Mar. 31, 2022

(86) PCT No.: PCT/IB2022/053047
§ 371 (c)(1),
(2) Date: Sep. 14, 2023

(87) PCT Pub. No.: WO2022/208451
PCT Pub. Date: Oct. 6, 2022

(65) Prior Publication Data
US 2024/0161734 A1 May 16, 2024

(30) Foreign Application Priority Data
Apr. 1, 2021 (EP) .................................... 21305426

(51) Int. Cl.
*G10L 15/06* (2013.01)
(52) U.S. Cl.
CPC .................................. *G10L 15/063* (2013.01)
(58) Field of Classification Search
CPC .... G10L 15/063; G10L 13/00; G06F 21/6245
See application file for complete search history.

(56) References Cited

U.S. PATENT DOCUMENTS 7,505,893 B2 3/2009 Mizutani et al.
8,306,819 B2 * 11/2012 Liu ..................... G10L 15/065
704/251

(Continued)

FOREIGN PATENT DOCUMENTS

CN 110648657 A 1/2020

OTHER PUBLICATIONS

International Search Report from PCT/IB2022/053047, Jun. 20, 2022, Torcal Serrano.

(Continued)

*Primary Examiner* — Michael Colucci
(74) *Attorney, Agent, or Firm* — BCF LLP

(57) ABSTRACT

Method and servers for generating a speech model for generating signals representative of utterances in a first language based on signals representative of utterances in a second language are disclosed. The method comprises transmitting a first and a second speech models to a first and a second devices of a first and a second users respectively. The first device is communicatively coupled with the second device by an encrypted communication link. A third speech model is acquired from the second device based on a local training of the second speech model on the second device. A training set comprises a first and a second decrypted signals representative of an utterance of the first user in the first language and a translated utterance of the first user in the second language respectively. The speech model is locally generated by the server by combining the second and third speech models.

15 Claims, 8 Drawing Sheets

(56) References Cited

U.S. PATENT DOCUMENTS

| | | | | |
|---|---|---|---|---|
| 9,928,379 | B1* | 3/2018 | Hoffer | G16H 50/20 |
| 2010/0262575 | A1* | 10/2010 | Moore | G06F 17/18 |
| | | | | 706/59 |
| 2011/0307253 | A1* | 12/2011 | Lloyd | G10L 15/20 |
| | | | | 704/E21.002 |
| 2018/0248692 | A1* | 8/2018 | Henderson | G06F 21/602 |
| 2019/0354592 | A1* | 11/2019 | Musham | G10L 13/00 |
| 2020/0117715 | A1 | 4/2020 | Lee et al. | |
| 2020/0311352 | A1* | 10/2020 | Miura | G06F 40/295 |
| 2021/0256352 | A1* | 8/2021 | Trost | G06N 3/08 |
| 2021/0303701 | A1* | 9/2021 | Santamaria-Pang | H04L 9/3006 |

OTHER PUBLICATIONS

English abstract of CN 110648657; retrieved from Espacenet on Sep. 14, 2023.

* cited by examiner

500

```
┌─────────────────────────────────────────────────────────┐
│ Transmit a first speech model to the first device, the first│
│ speech model for locally generating by the first device │
│ signals representative of utterances in the second      │
│ language based on signals representative of utterances in│──  505
│ the first language                                      │
└─────────────────────────────────────────────────────────┘
                            │
┌─────────────────────────────────────────────────────────┐
│ Transmit a second speech model to the second device, the│
│ second speech model for locally generating signals      │
│ representative of utterances in the second language based│
│ on signals representative of utterances in the first    │──  510
│ language                                                │
└─────────────────────────────────────────────────────────┘
                            │
┌─────────────────────────────────────────────────────────┐
│ Acquire a third speech model from the second device, the│
│ third speech model being the second speech model that   │──  515
│ has been locally trained on the second device based on a│
│ training set                                            │
└─────────────────────────────────────────────────────────┘
                            │
┌─────────────────────────────────────────────────────────┐
│ Generate the speech model by combining the second       │──  520
│ speech model with the third speech model.               │
└─────────────────────────────────────────────────────────┘
```

Figure 5

SYSTEM AND METHOD FOR TRANSLATION OF STREAMING ENCRYPTED CONTENT

CROSS-REFERENCE TO RELATED APPLICATIONS

The present patent application is a national phase entry of International Patent Application Number PCT/IB2022/053047 entitled "System And Method For Translation Of Streaming Encrypted Content", filed on Mar. 31, 2022, which claims priority from European Patent Application Number 21305426.5, entitled "System And Method For Translation Of Streaming Encrypted Content", filed on Apr. 1, 2021, the content of each of which is incorporated herein by reference in its entirety.

FIELD

The present technology relates to systems and methods for providing translation of streaming encrypted content. In particular, a system and methods for generating and training a speech model based on encrypted content are disclosed.

BACKGROUND

Social networks have recently gained traction as the rise of global communications networks such as the Internet enables users to reach out in an efficient and convenient manner. Indeed, the Internet brought numerous users int contact with one another via mobiles devices (e.g. smartphones), e-mails, websites, etc. Notably, social networks or platforms enable people from different countries to speak and even provide services one to another. Nonetheless, language barriers may be an issue for communication between users of different countries or having different languages. Many technologies attempted to address this problem by providing translation services to the platform by, for example, providing a Machine Learning Algorithm (MLA) trained to translate content spoken and/or written by the users.

However, such solutions usually rely on datasets comprising actual signals emitted by users (audio signals and/or textual signals directly provided by users) and which are acquired by a server to train the speech model.

Other solutions can translate messages only once the entirety of the message is received. In other words, users speaking in different languages thus cannot have a "live" conversation where translation services are provided as the user speaks, as opposed to waiting for the user to complete her utterance for translating the content into another language.

Even though the recent developments identified above may provide benefits, improvements are still desirable.

SUMMARY

Embodiments of the present technology have been developed based on developers' appreciation of shortcomings associated with the prior art. It should be noted that solutions relying on datasets comprising actual signals emitted by users and which are acquired by a server to train speech models disregard data privacy considerations when dealing with user conversations.

Developers of the present technology have devised methods and servers for generating a speech model on a server, without explicitly providing training datasets including audio signals of actual user conversions to that server. In at least some embodiments of the present technology, user devices may be communicatively coupled by a first end-to-end encrypted communicational link, and the server may be communicatively coupled with a given user device by a respective end-to-end encrypted communication link.

In some embodiments of the present technology, the server may transmit a first speech model to a first device and a second speech model to a second device. For example, the first speech model may be used for generating signals in language B based on signals in language A, while the second speech model may be used from generating signals in language A based on signals in language B. The first device may generate a first A signal in language A based on an utterance of a first user. This first A signal may be locally used on the first device by the first speech model for generating a first B signal. In some embodiments, both the first A signal and the first B signal may be encrypted locally on the first device and transmitted to the second device. The second device may be configured to decrypt the received information, and it can be said that the second device now has access to a first decrypted A signal (first A signal having been encrypted and decrypted) and a first decrypted B signal (first B signal having been encrypted and decrypted).

The second device may use the first decrypted B signal for reproducing a computer-generated utterance for a second user. This computer-generated utterance is in language B. Also, it is contemplated that the first decrypted A signal and the first decrypted B signal may be used for generating a training set for locally training the second speech model on the second device. For example, the first decrypted B signal can be used as a training input for the second speech model for generating a second A signal. The second A signal may be compared against the first decrypted A signal for training the second speech model. For example, the second device may provide the first decrypted A signal and the second A signal as inputs into a given loss function that is configured to generate an output based on which the second speech model can be trained (e.g., model parameters can be adjusted).

It can be said that the second speech model is a third speech model or an updated second speech model. Information representative of the updated second speech model may be transmitted to the server. The server is configured to locally generate a new speech model based on the second speech model and the information representative of the updated second speech model. This can be performed by employing one or more federated learning techniques.

In other embodiments, instead of locally training the second speech model on the second device based on the training set as explained above, the second device may be configured to transmit to the server an indication of the loss function representative of a comparison between the second A signal and the first decrypted A signal. In these embodiments, the server may be configured to locally train the second speech model (thereby generated a new speech model/updated second speech model) based on the indication of the loss function, without departing from the scope of the present technology.

Developers of the present technology have realized that such generation of a new speech model on the server does not require provision of signals representative of actual spoken conversations between the first and the second user to the server. As mentioned above, the signals representative of actual spoken conversations may be used for locally training one or more speech models on the respective user devices and information representative of so-locally trained models may be transmitted to the server for performing one or more federated learning techniques locally on the server. Also, the signals representative of actual conversations may be used for locally generating indications of loss functions that can be transmitted to the server for locally training a speech model.

The server and the first and second devices may be referred to as a communication system. In at least some embodiments of the present technology, the communication system may be a "commercially-oriented" communication system. Broadly speaking, a given commercially-oriented communication system may be of use to users that communicate in a common commercial environment. Notably, the users may seek for advice, for being provided with a service, for having commercially-oriented communication and/or any other type of communication with other users or service providers (SPs) in that common commercial environment. Hence, users of such a system may be provided with digital content that is specific to a given commercial environment. The communication system may further enable to have live conversations with other users or SPs that speak a different language, the communication system providing translated utterances for both parties.

For instance, the communication system may be embodied as a given real-estate-oriented communication system where users may communicate with, for instance, service providers (SPs) that operate in the real-estate sector. Such SPs may include, but are not limited to: designers, real estate agents, contractors, electricians, plumbers, insurance companies, decorators, landscaping agency, and so forth. Users of such a communication system may be provided with a digital content feed including real-estate-oriented digital content from the SPs and communication means to communicate with the SPs non-exhaustively listed immediately above.

In another instance, the communication system may be embodied as a given car-oriented communication system where users may communicate with SPs that operate in the car/automotive sector. Such SPs may include, but are note limited to: dealerships, insurance companies, after-market body shops, car repairing shops, manufacturers, valuators, mechanics, and so forth. Users of such a recommendation system may be provided with a digital content feed including car-oriented digital content from the SPs and communication means to communicate with the SPs non-exhaustively listed immediately above.

In a further instance, the communication system may be embodied as a given healthcare-oriented communication system where users may communicate with SPs that operate in a healthcare sector. Such SPs may comprise: doctors, clinics, chiropractors, personal trainers, gyms, nutritionists, supplement manufacturers, training equipment distributors, and so forth. Users of such a recommendation system may be provided with a digital content feed including healthcare-oriented digital content from the SPs and communication means to communicate with the SPs non-exhaustively listed immediately above.

As the common commercial environment may relate to a specific topic such as, for example, real-estate, the communication system may be provided with specialized training datasets that are thus related to the specific topic. More specifically, as users and SPs that use the communication system are more likely to communicate about the specific topic and thereby use specialized lexicon, the speech model may be trained to perform translation based on this specialized lexicon. Therefore, it can be said that the speech model is a "specialized" speech model configured to provide accurately translated utterances for the common commercial environment of the communication system.

Usually, standard speech models may provide different translations of a same word. For instance, a given word may be translated into English as "home" or "house" by a standard speech model. However, training of the speech model using specialized lexicon provided by the communication system disclosed herein may enable the speech model to provide a correct translation of utterances based on said specialized lexicon. Such specialized speech model thus alleviates inaccuracy of translated utterances related to the specific topic of the common commercial environment. In this instance, if the commercial environment is the real-estate sector, a specialized speech model trained in accordance with at least some embodiments of the present technology may allow translating a given word into English as "house", as opposed to "home".

In a first broad aspect of the present technology, there is provided a method of generating a speech model, the speech model for generating signals representative of utterances in a first language and a second language based on respective signals representative of utterances in the second and first languages respectively. The speech model is hosted by a server communicatively coupled with a first device associated with a first user and a second device associated with a second user. The method is executable by the server. The method comprises transmitting, by the server, a first speech model to the first device, the first speech model for locally generating by the first device signals representative of utterances in the second language based on signals representative of utterances in the first language. The method comprises transmitting, by the server, a second speech model to the second device, the second speech model for locally generating by the second device signals representative of utterances in the first language based on signals representative of utterances in the second language. The first device is communicatively coupled with the second device by an encrypted communication link. The method comprises acquiring, by the server, a third speech model from the second device, the third speech model being the second speech model that has been locally trained on the second device based on a training set. The training set includes a first decrypted signal being a given signal generated by the first device based on utterance of the first user in the first language and having been encrypted by the first device and decrypted by the second device, a second decrypted signal being another given signal generated by the first speech model based on the given signal and having been encrypted by the first device and decrypted by the second device. The other given signal is representative of a translated utterance of the first user in the second language. The third speech model has been trained to generate a training signal based on the second decrypted signal such that the training signal is similar to the first encrypted signal. The method comprises locally generating, by the server, the speech model by combining the second speech model with the third speech model.

In some embodiments of the method, the method further comprises storing, by the server, the second model in a memory.

In some embodiments of the method, the method further comprises acquiring, by the server, a fourth speech model from the first device, the fourth speech model being the first speech model that has been locally trained on the first device based on another training set. The other training set includes a third decrypted signal being the training signal generated by the third speech model on the second device and having been encrypted by the second device and decrypted by the first device; and the given signal generated by the first device based on the utterance of the first user in the first language. The fourth speech model has been trained to generate another training signal based on the third decrypted signal such that the other training signal is similar to the given signal. The method comprises locally generating, by the server, another speech model by combining the first speech model with the fourth speech model.

In some embodiments of the method, the method further comprises transmitting, by the server, the first speech model to the second device, the first speech model for locally generating by the second device signals representative of utterances in the second language based on signals representative of utterances in the first language. The method comprises acquiring, by the server, a fourth speech model from the second device, the fourth speech model being the first speech model that has been locally trained on the second device based on another training set, the other training set including the first decrypted signal and the second decrypted signal. The fourth speech model has been trained to generate another training signal based on the first decrypted signal such that the other training signal is similar to the second encrypted signal. The method comprises locally generating, by the server, another speech model by combining the first speech model with the fourth speech model.

In some embodiments of the method, model parameters of the third model for acquiring the third model are transmitted from the second device to the server over an end-to-end encrypted communication link.

In some embodiments of the method, the encrypted communication link is an end-to-end encrypted communication link.

In some embodiments of the method, the first device and the second device are configured to execute an end-to-end encryption algorithm.

In some embodiments of the method, the encryption algorithm is at least one of: Twofish algorithm, Triple Diffie-Hellman algorithm and Double Ratchet algorithm.

In some embodiments of the method, the locally generating the other speech model by combining the second speech model with the third speech model comprises employing, by the server, a federated learning algorithm.

In some embodiments of the method, the first speech model is a Neural Machine Translation (NMT) system.

In some embodiments of the method, the first language and the second language include any two of: French, English, Russian, Spanish, Italian, and German.

In a second broad aspect of the present technology, there is provided a server for generating a speech model, the speech model for generating signals representative of utterances in a first language and a second language based on respective signals representative of utterances in the second and first languages respectively, the server hosting the speech model. The server is communicatively coupled with a first device associated with a first user and a second device associated with a second user. The server is configured to transmit a first speech model to the first device, the first speech model for locally generating by the first device signals representative of utterances in the second language based on signals representative of utterances in the first language. The server is configured to transmit a second speech model to the second device, the second speech model for locally generating by the second device signals representative of utterances in the first language based on signals representative of utterances in the second language. The first device is communicatively coupled with the second device by an encrypted communication link. The server is configured to acquire a third speech model from the second device, the third speech model being the second speech model that has been locally trained on the second device based on a training set. The training set includes a first decrypted signal being a given signal generated by the first device based on utterance of the first user in the first language and having been encrypted by the first device and decrypted by the second device. The training set includes a second decrypted signal being another given signal generated by the first speech model based on the given signal and having been encrypted by the first device and decrypted by the second device, the other given signal being representative of a translated utterance of the first user in the second language. The third speech model has been trained to generate a training signal based on the second decrypted signal such that the training signal is similar to the first encrypted signal. The server is configured to locally generate the speech model by combining the second speech model with the third speech model.

In some embodiments of the server, the server is further configured to store the second model in a memory.

In some embodiments of the server, the server is further configured to acquire a fourth speech model from the first device, the fourth speech model being the first speech model that has been locally trained on the first device based on another training set. The other training set includes a third decrypted signal being the training signal generated by the third speech model on the second device and having been encrypted by the second device and decrypted by the first device; and the given signal generated by the first device based on the utterance of the first user in the first language. The fourth speech model has been trained to generate another training signal based on the third decrypted signal such that the other training signal is similar to the given signal. The server is configured to locally generate another speech model by combining the first speech model with the fourth speech model.

In some embodiments of the server, the server is further configured to transmit the first speech model to the second device, the first speech model for locally generating by the second device signals representative of utterances in the second language based on signals representative of utterances in the first language. The server is configured to acquire a fourth speech model from the second device, the fourth speech model being the first speech model that has been locally trained on the second device based on another training set. The other training set includes the first decrypted signal and the second decrypted signal. The fourth speech model has been trained to generate another training signal based on the first decrypted signal such that the other training signal is similar to the second encrypted signal. The server is configured to locally generate another speech model by combining the first speech model with the fourth speech model.

In some embodiments of the server, model parameters of the third model for acquiring the third model are transmitted from the second device to the server over an end-to-end encrypted communication link.

In some embodiments of the server, the encrypted communication link is an end-to-end encrypted communication link.

In some embodiments of the server, the first device and the second device are configured to execute an end-to-end encryption algorithm.

In some embodiments of the server, the encryption algorithm is at least one of: Twofish algorithm, Triple Diffie-Hellman algorithm and Double Ratchet algorithm.

In some embodiments of the server, the server employs a federated learning algorithm to locally generate the other speech model by combining the second speech model with the third speech model.

In some embodiments of the server, the first speech model is a Neural Machine Translation (NMT) system.

In some embodiments of the server, the first language and the second language include any two of: French, English, Russian, Spanish, Italian, and German.

In a third broad aspect of the present technology, there is provided a method of generating a speech model, the speech model for generating signals representative of utterances in a first language and a second language based on respective signals representative of utterances in the second and first languages respectively, the speech model being hosted by a server communicatively coupled with a first device associated with a first user and a second device associated with a second user. The method is executable by the server. The method comprises transmitting, by the server, a first speech model to the first device, the first speech model for locally generating by the first device signals representative of utterances in the second language based on signals representative of utterances in the first language. The method comprises transmitting, by the server, a second speech model to the second device, the second speech model for locally generating by the second device signals representative of utterances in the first language based on signals representative of utterances in the second language. The first device is communicatively coupled with the second device by an encrypted communication link. The method comprises acquiring, by the server, an indication of a loss function from the second device. The indication has been generated based on a comparison of a first decrypted signal being a given signal generated by the first device based on utterance of the first user in the first language and having been encrypted by the first device and decrypted by the second device, and a training signal generated by the second speech model based on a second decrypted signal, the second decrypted signal being another given signal generated by the first speech model based on the given signal and having been encrypted by the first device and decrypted by the second device. The other given signal is representative of a translated utterance of the first user in the second language. The method comprises locally training, by the server, at least one of the first speech model and the second speech model based on the indication of the loss function, thereby generating the speech model.

In some embodiments of the method, the method further comprises storing, by the server, the second model in a memory.

In some embodiments of the method, the method further comprises acquiring, by the server, an indication of a loss function from the first device. The indication of a loss function from the first device having been generated based on a comparison of a third decrypted signal being the training signal generated by the third speech model on the second device and having been encrypted by the second device and decrypted by the first device; and the given signal generated by the first device based on the utterance of the first user in the first language. The method comprises locally training, by the server, at least one of the first speech model and the second speech model based on the indication of the loss function from the first device, thereby generating the speech model.

In some embodiments of the method, the method comprises transmitting, by the server, the first speech model to the second device, the first speech model for locally generating by the second device signals representative of utterances in the second language based on signals representative of utterances in the first language. The method comprises acquiring, by the server, an indication of a loss function from the second device. The indication has been generated based on a comparison of the first decrypted signal and the second decrypted signal. The method comprises locally training, by the server, the first speech model based on the indication of the loss function from the first device, thereby generating the speech model.

In some embodiments of the method, the indication of the loss function is transmitted from the second device to the server over an end-to-end encrypted communication link.

In some embodiments of the method, the encrypted communication link is an end-to-end encrypted communication link.

In some embodiments of the method, the first device and the second device are configured to execute an end-to-end encryption algorithm.

In some embodiments of the method, the encryption algorithm is at least one of: Twofish algorithm, Triple Diffie-Hellman algorithm and Double Ratchet algorithm.

In some embodiments of the method, the first speech model is a Neural Machine Translation (NMT) system.

In some embodiments of the method, the first language and the second language include any two of: French, English, Russian, Spanish, Italian, and German.

In a fourth broad aspect of the present technology, there is provided a server for generating a speech model, the speech model for generating signals representative of utterances in a first language and a second language based on respective signals representative of utterances in the second and first languages respectively. The server is configured to host the speech model. The server is communicatively coupled with a first device associated with a first user and a second device associated with a second user. The server is configured to transmit a first speech model to the first device, the first speech model for locally generating by the first device signals representative of utterances in the second language based on signals representative of utterances in the first language. The server is configured to transmit a second speech model to the second device, the second speech model for locally generating by the second device signals representative of utterances in the first language based on signals representative of utterances in the second language. The first device is communicatively coupled with the second device by an encrypted communication link. The server is configured to acquire an indication of a loss function from the second device. The indication has been generated based on a comparison of a first decrypted signal being a given signal generated by the first device based on utterance of the first user in the first language and having been encrypted by the first device and decrypted by the second device, and a training signal generated by the second speech model based on a second decrypted signal, the second decrypted signal being another given signal generated by the first speech model based on the given signal and having been encrypted by the first device and decrypted by the second device. The other given signal is representative of a translated utterance of the first user in the second language. The server is configured to locally train at least one of the first speech model and the second speech model based on the indication of the loss function, thereby generating the speech model.

In some embodiments of the server, the server is configured to store the second model in a memory.

In some embodiments of the server, the server is configured to acquire an indication of a loss function from the first device. The indication of a loss function from the first device has been generated based on a comparison of a third decrypted signal being the training signal generated by the third speech model on the second device and having been encrypted by the second device and decrypted by the first device; and the given signal generated by the first device based on the utterance of the first user in the first language. The server is configured to locally train at least one of the first speech model and the second speech model based on the indication of the loss function from the first device, thereby generating the speech model.

In some embodiments of the server, the server is further configured to transmit the first speech model to the second device, the first speech model for locally generating by the second device signals representative of utterances in the second language based on signals representative of utterances in the first language. The server is configured to acquire an indication of a loss function from the second device. The indication has been generated based on a comparison of the first decrypted signal and the second decrypted signal. The server is configured to locally train the first speech model based on the indication of the loss function from the first device, thereby generating the speech model.

In some embodiments of the server, the indication of the loss function is transmitted from the second device to the server over an end-to-end encrypted communication link.

In some embodiments of the server, the encrypted communication link is an end-to-end encrypted communication link.

In some embodiments of the server, the first device and the second device are configured to execute an end-to-end encryption algorithm.

In some embodiments of the server, the encryption algorithm is at least one of: Twofish algorithm, Triple Diffie-Hellman algorithm and Double Ratchet algorithm.

In some embodiments of the server, the first speech model is a Neural Machine Translation (NMT) system.

In some embodiments of the server, the first language and the second language include any two of: French, English, Russian, Spanish, Italian, and German.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 5 illustrates a flow diagram showing operations of a method for generating a speech model in accordance with non-limiting embodiments of the present technology;

Figure 1:
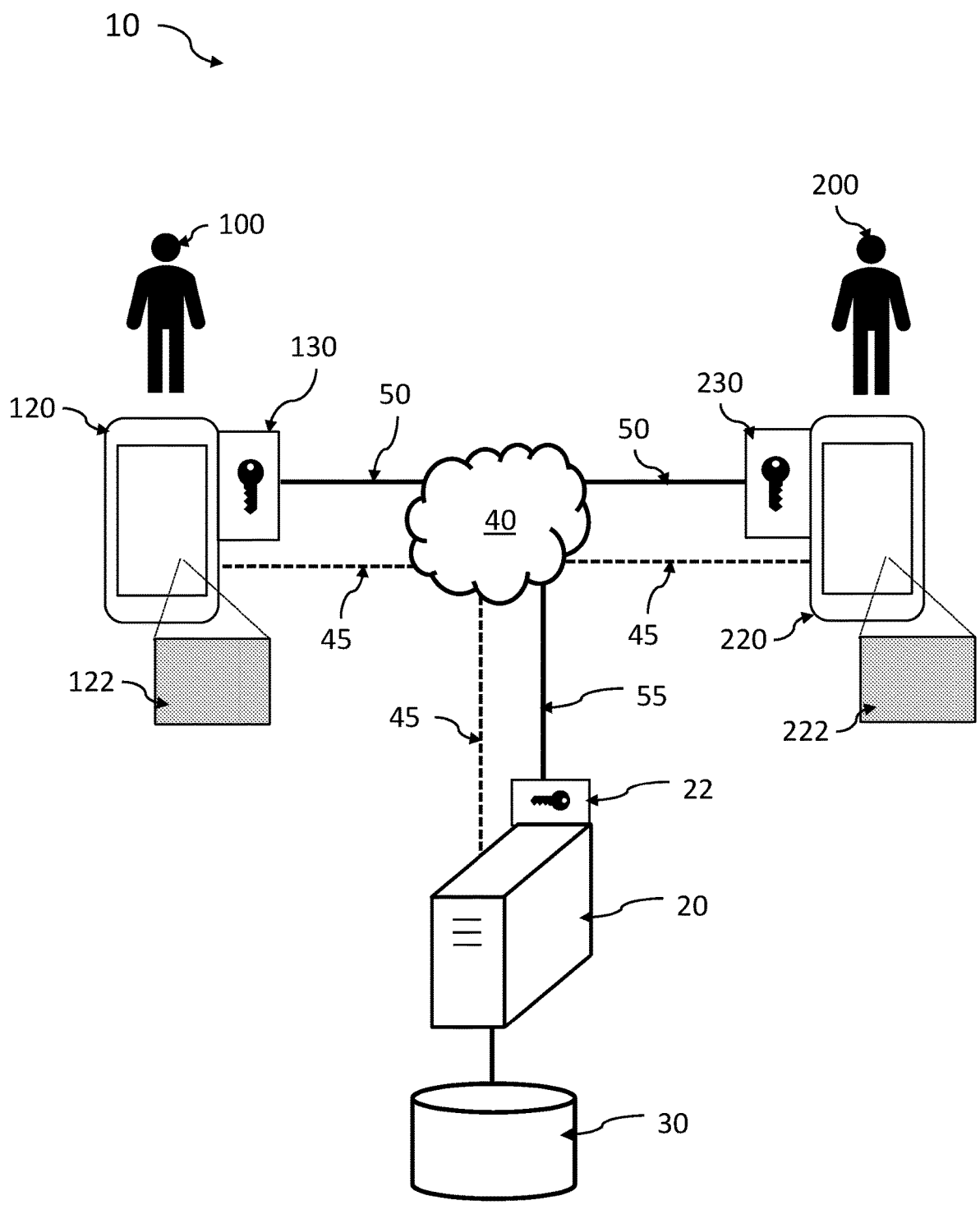
FIG. 1 is a schematic representation of communication environment in accordance with non-limiting embodiments of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In an aspect, the present technology provides methods for generating a speech model configured to generate signals representative of utterances in a first language based on signals representative of utterances in a second language. Embodiments of the present technology thus provide techniques for enabling two users communicating in different languages to communicated over an end-to-end encrypted communication link. The users may communicate via a platform or a social network hosted on a server. To do so, each of the users may use a respective user device to access said platform over the Internet for instance. In a broad aspect, the speech model is generated and trained to provide translation of the communication between users.

In a more general aspect, a user who may desire communicating with another user may, for instance, emit a query to the platform representative of a request to engage or continue a conversation with the other user; For example, a first user may enter a phone number, a username or any other information suitable for finding and communicating with a second user.

With these fundamentals in place, we will now consider some non-limiting examples to illustrate various implementations of aspects of the present technology.

Referring to FIG. 1, there is shown a schematic diagram of a system 10, the system 10 being suitable for implementing non-limiting embodiments of the present technology. It is to be expressly understood that the system 10 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 10 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 10 may provide in certain instances simple implementations of the present technology, and that where such is the case they have been presented in this manner as an aid to understanding. As persons skilled in the art would understand, various implementations of the present technology may be of a greater complexity.

Generally speaking, the system 10 is configured to provide streaming translation services to users of the system 10. For example, a user 100 speaking in a first language and a user 200 speaking in a second language may have a "live" conversation with one another using the system 10. As such, any system variation configured to enable live translation of encrypted communication between users speaking distinct languages or, more generally, enable live translation of a communication between two users can be adapted to execute embodiments of the present technology, once teachings presented herein are appreciated. Furthermore, the system 10 will be described using an example of the system 10 being a communication system (therefore, the system 10 can be referred to herein below as a "communication system 10"). However, embodiments of the present technology can be equally applied to other types of the system 10, as will be described in greater detail herein below.

Developers of the present technology have realized that data privacy is beneficial for users of the system 10 for ensuring confidentiality of their conversations. In some embodiments of the present technology, the system 10 may be configured to train a "speech" model for performing translation in an end-to-end encrypted communication environment.

In this embodiment, the aforementioned translation services are provided to users having conversations related to a common topic which may be for example, real-estate. Therefore, the speech model learnt by the system 10 may be specialized to real-estate related conversation as specific lexicon is used to train said speech model. In other illustrative examples, the system 10 may enable users to communicate and have conversation about other specialized topic such as car industry, human resources and employment, boats and sailing, healthcare, hotel business, etc. The speech model may be thus trained a specialized lexicon based on topics of conversations of the users of the system 10.

Electronic Device

The system 10 comprises at least a first electronic device 120 and a second electronic device 220, each of the first and second electronic devices 120, 220 being associated with a first and a second user 100, 200 respectively. As such, the first and second electronic devices 120, 220 can sometimes be referred to as a "client devices", "user devices" or "client electronic devices". It should be noted that the fact that the first and second electronic devices 120, 220 are associated with the first and a second user 100, 200 does not need to suggest or imply any mode of operation—such as a need to log in, a need to be registered, or the like. It should be appreciated that in other embodiments, the environment 100 can include additional users and user devices.

The implementation of the first and second devices 120, 220 is not particularly limited, but as an example, the first and second devices 120, 220 may be implemented as a personal computer (desktops, laptops, netbooks, etc.), a wireless communication device (such as a smartphone, a cell phone, a tablet and the like), as well as network equipment (such as routers, switches, and gateways). The first and second devices 120, 220 comprises hardware and/or software and/or firmware (or a combination thereof), as is known in the art, to execute communication applications 122, 222 respectively. Generally speaking, the purpose of the communication applications 122, 222 is to enable the users 100, 200 to access a communication platform hosted on a server 20 and communicate in their respective language and receiving signals representative of translation of utterance formed by the other user via the communication applications 122, 222, as will be described in greater detail herein below. As such, the first and second devices 120, 220 of FIG. 1 may include any type of computing device that enables users to transmit and receive textual and/or spoken utterances in any language supported by the communication platform.

The first and second devices 120, 220 receive the communication applications 122, 222 from, for example, the server 20. For instance, the user device 120 may receive the communication application 122 based on preferences of the corresponding user 100. More specifically, the first user 100 may specify that his preferred language is French. The server 20 thus transmit a communication application in French. Similarly, the second user 200 may specify that his preferred language is Russian. The server 20 thus transmit a communication application in Russian. Alternatively, the first and second users 100, 200 may receive the same communication application on their respective first and second user devices 120, 220 and subsequently select a preferred language within the communication application. In other embodiments, the first and second devices 120, 220 receive the communication application from another entity that enables a user to download an application onto their devices. In this embodiment, a user 20 (a given one of a plurality of users of the system 10) may be a subscriber to a communication service provided by the system 10. However, the subscription does not need to be explicit or paid for. For example, the user 20 can become a subscriber by virtue of downloading a recommendation application from the system 10, by registering and provisioning a log-in/password combination, by registering and provisioning user preferences and the like.

It should be understood that the communication applications 122, 222 and/or one or more functions thereof may be part of another application on the first and second devices 120, 220. For example, the communication applications 122, 222 may be part of a recommendation application providing recommendation of real estate related items to users of the system 10. The communication applications 122, 222 thus enable users of the recommendation application to access the functionality of the aforementioned "live" communication provided by the communication applications 122, 222.

It should be appreciated that different types of the communication application may be transmitted based on the type of user device. For instance, a smartphone user device may receive an application configured to operate on a smartphone while a personal computer user device may receive an application configured to operate on a personal computer.

Figure 2:
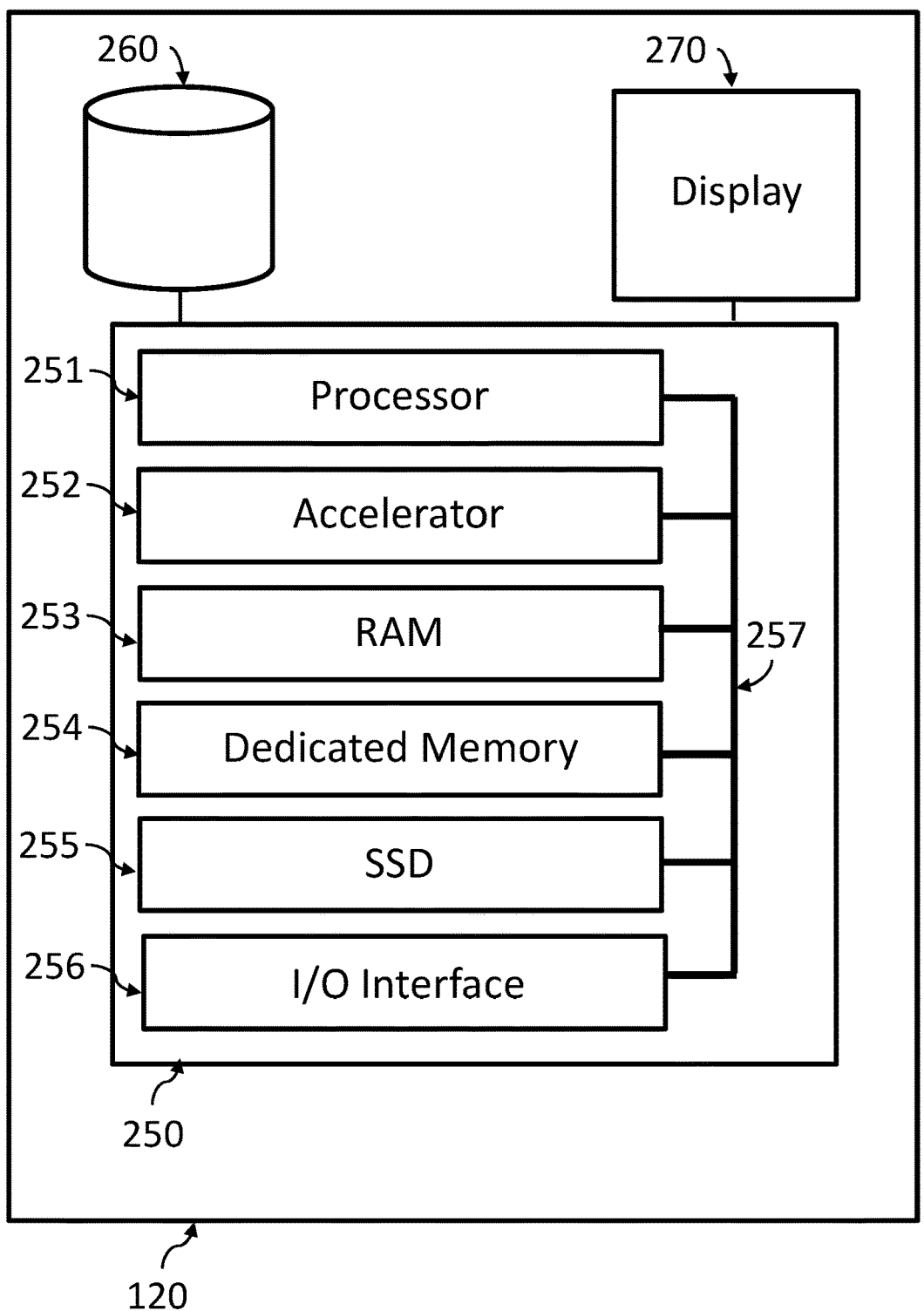
FIG. 2 is a schematic representation of a user device configured for accessing a communication platform in accordance with an embodiment of the present technology.

FIG. 2 is a schematic representation of the user device 120 in accordance with an embodiment of the present technology. It should be understood that the user device 220 may have similar or equivalent features. Therefore, only the user device 120 will be described herein above.

The user device 120 comprises a computing unit 250. The In some embodiments, the computing unit 250 may be implemented by any of a conventional personal computer, a controller, and/or an electronic device (e.g., a server, a controller unit, a control device, a monitoring device etc.) and/or any combination thereof appropriate to the relevant task at hand. In some embodiments, the computing unit 250 comprises various hardware components including one or more single or multi-core processors collectively represented by a processor 251, a solid-state drive 255, a RAM 253, a dedicated memory 254 and an input/output interface 256. The computing unit 250 may be a generic computer system.

In some other embodiments, the computing unit 250 may be an "off the shelf" generic computer system. In some embodiments, the computing unit 250 may also be distributed amongst multiple systems. The computing unit 250 may also be specifically dedicated to the implementation of the present technology. As a person in the art of the present technology may appreciate, multiple variations as to how the computing unit 250 is implemented may be envisioned without departing from the scope of the present technology.

Communication between the various components of the computing unit 250 may be enabled by one or more internal and/or external buses 257 (e.g. a PCI bus, universal serial bus, IEEE 1394 "Firewire" bus, SCSI bus, Serial-ATA bus, ARINC bus, etc.), to which the various hardware components are electronically coupled.

The input/output interface 256 may provide networking capabilities such as wired or wireless access. As an example, the input/output interface 256 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 220 stores program instructions suitable for being loaded into the RAM 230 and executed by the processor 251. Although illustrated as a solid-state drive 255, any type of memory may be used in place of the solid-state drive 255, such as a hard disk, optical disk, and/or removable storage media.

The processor 251 may be a general-purpose processor, such as a central processing unit (CPU) or a processor dedicated to a specific purpose, such as a digital signal processor (DSP). In some embodiments, the processor 251 may also rely on an accelerator 252 dedicated to certain given tasks, such as executing the methods set forth in the paragraphs below. In some embodiments, the processor 251 or the accelerator 252 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Further, the user device 120 may include a screen or display 270 capable of rendering an interface of the communication platform. In some embodiments, display 270 may comprise and/or be housed with a touchscreen to permit users to input data via some combination of virtual keyboards, icons, menus, or other Graphical User Interfaces (GUIs). In some embodiments, display 270 may be implemented using a Liquid Crystal Display (LCD) display or a Light Emitting Diode (LED) display, such as an Organic LED (OLED) display. The device may be, for example, an iPhone® from Apple or a Galaxy® from Samsung, or any other mobile device whose features are similar or equivalent to the aforementioned features. The device may be, for example and without being limitative, a handheld computer, a personal digital assistant, a cellular phone, a network device, a smartphone, a navigation device, an e-mail device, a game console, or a combination of two or more of these data processing devices or other data processing devices.

The user device 120 may comprise a memory 260 communicably connected to the computing unit 250 and configured to store data, settings of the communication application, or any other information relevant for running the communication application on the user device 120. The memory 260 may be embedded in the user device 120 as in the illustrated embodiment of FIG. 2 or located in an external physical location. Information representative of the communication application 122 may be store in the memory

260. The computing unit 250 may be configured to access a content of the memory 260 via a network (not shown) such as a Local Area Network (LAN) and/or a wireless connection such as a Wireless Local Area Network (WLAN).

The first user device 120 is configured to execute the communication application 122 and one or more local speech models associated thereto. Similarly, the second user device 220 may be configured to execute the communication application 222 and one or more local speech model associated thereto.

The user device 120 may also includes a power system (not depicted) for powering the various components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

Figure 4:
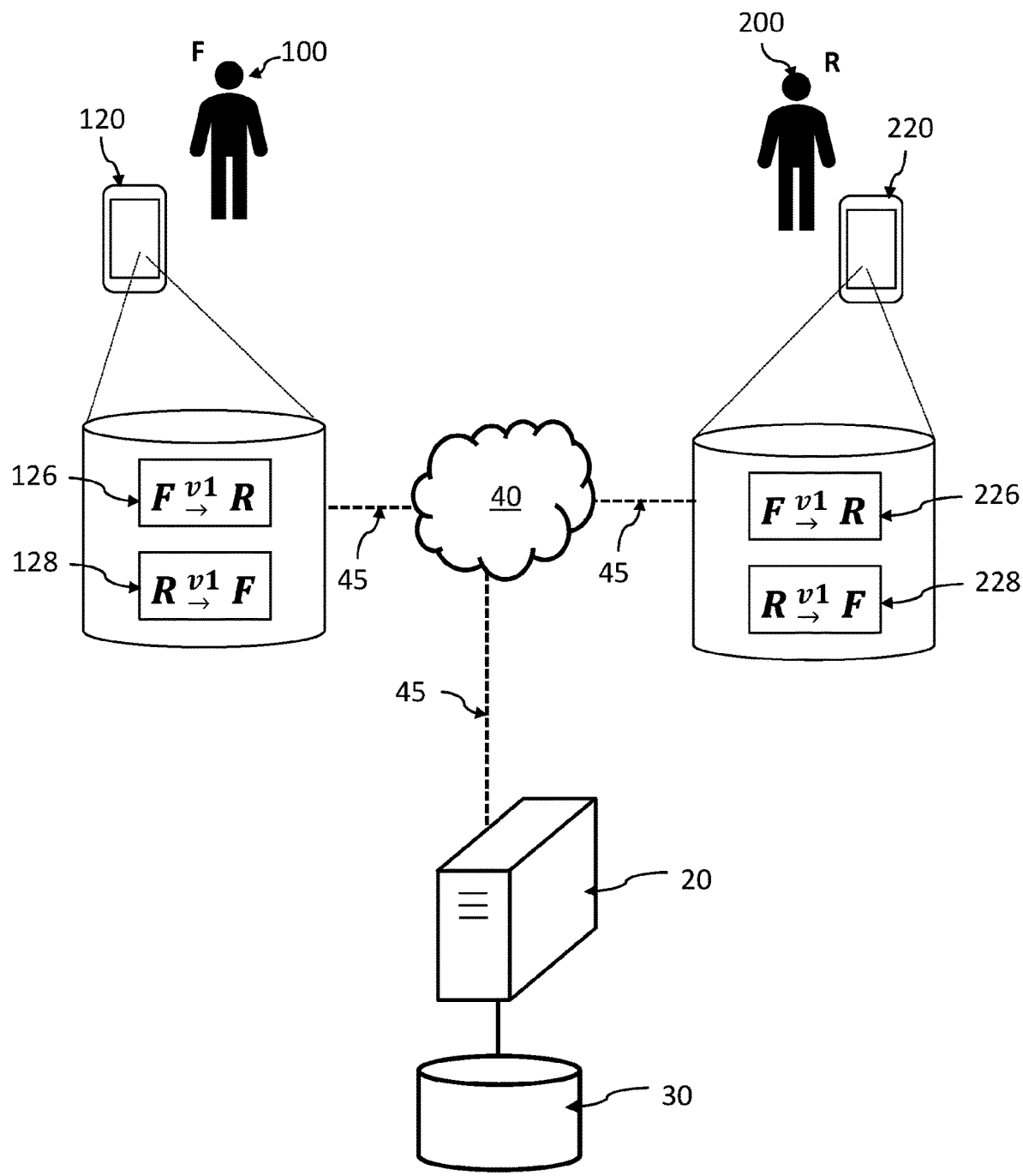
FIG. 4 is a schematic representation of a content of local speech models in accordance with non-limiting embodiments of the present technology.

Returning to the description of FIG. 1 and with additional reference to FIG. 4, the local speech models 126, 128 and 226, 228 are configured to receive signals representative of utterances in a first respective language and generate signals representative of a translation of said utterances in another respective language. The signals generated by the local speech models 126, 128 and 226, 228 may then transmitted to a target user and/or rendered by a user device to provide the translation of said utterance to the target user under textual or audible form.

The local speech models are, in this embodiment, speech models that are hosted locally on the first and second devices 120, 220. Broadly speaking, speech models are usually broken into three components: an Automatic Speech Recognition (ASR) component, a machine translation component and a text-to-speech synthesis component. The automatic speech recognition may transcribe a spoken utterance uttered from one of the first and second users 100, 200. In some embodiments, it can be said that the automatic speech recognition is a speech-to-text component. The machine translation component may further translate the transcribed text in a language of a second one of the first and second users 100, 220, namely a "target" user. Eventually, the text-to-speech synthesis may generate a signal representative of a translation of the spoken utterance by generating speech in a language of the target user from the translated text. In some embodiments, each of the local speech models 126, 128 and 226, 228 may comprise a speech-to-text (S2T) component to transcribe a spoken utterance in a first language in a first text, a text-to-text (T2T) component for translating the first text in the first language in a second text in a second language, and a text-to-speech (T2S) component for reproducing an utterance based on second text in the second language. It can also be said that the local speech models 126, 128 and 226, 228 may comprise Machine Learning Algorithms (MLA) to perform the functionalities of a given ASR engine or of a S2T component, of a given T2T component, and of a given T2S component.

More specifically, the S2T components of the local speech models 126, 128 and 226, 228 are trained to transcribe a spoken utterance in a first language in a first text. In at least some embodiments, said training is performed by using audio recordings as training input data, the audio recordings comprising utterances of sentences in the first language. Outputs of the S2T components are texts in the first language, the texts being textual transcriptions of the audio utterances. In some embodiments, training of the S2T components is based one S2T training dataset that comprises a training input signal representative of a training utterance in the first language and a training label representative of the training utterance under a textual form. During a given iteration, the training label can be further compared to an output of the S2T components such that errors of transcription may be backpropagated to update the models of the S2T components. The comparison of the output of the S2T components during training against the training label may be performed by employing a loss function for determining a "loss" that is used for adjusting the S2T components during the respective training iteration. In one embodiment, said loss function is a Connectionist Temporal Classification (CTC) loss function whose related documentation is available at https://distill.pub/2017/ctc/. In the same or another embodiment, the S2T components are based on the Wav2Vec2.0 framework, or the CTC framework.

Additionally, the T2T components of the local speech models 126, 128 and 226, 228 are trained to translate a first text in a first language in a second text in a second language, the first and second texts having thus a same meaning. In at least some embodiments, said training is performed by using first texts in the first language as training input data. Outputs of the T2T components are second texts in the second language, the second texts being textual translations of the first texts. In some embodiments, training of the T2T components is based one T2T training dataset that comprises a training input text representative of a first text in the first language and a training label representative of the first text in the second language. In this embodiment, the training input text is a vectorized text. During a given iteration, the training label can be further compared to an output of the T2T components such that errors of translation may be backpropagated to update the models of the T2T components. The comparison of the output of the T2T components during training against the training label may be performed by employing a loss function for determining a "loss" that is used for adjusting the T2T components during the respective training iteration. In one embodiment, said loss function measures an entropy between the training label and the output. For example, said loss function may determine a sparse categorical cross entropy, such as defined in https://www.tensorflow.org/api_docs/python/tf/keras/losses/SparseCategoricalCrossentropy, or determine a mixed cross entropy, such as defined in https://arxiv.org/pdf/2106.15880.pdf. In the same or another embodiment, the T2T components are implemented as Encoder-Decoder models, Attention-based Encoder-Decoders models, Long short-term memory (LSTM) models or Gated Recurrent Units models.

Additionally, the T2S components of the local speech models 126, 128 and 226, 228 are trained to generate an audio signal of an utterance in a given language from a given text in the same given language, the utterance and the given text having a same meaning. In other words, the T2S components may synthesise a natural sounding speech from textual transcripts. In at least some embodiments, said training is performed by using texts in the given language as training input data. Said texts may be generated by one of the S2T components. In this embodiment, said texts are generated manually for training purposes. Outputs of the T2S components are audio signals of utterances in the given language. Said audio signals may be combinations of speech segments. In some embodiments, training of the T2S components is based one T2S training dataset that comprises a training input text in a given language and a training label. The training label is an audio signal representative of an utterance in the given language of the training input text. During a given iteration, the training label can be further compared to an output of the T2S components such that errors of translation may be backpropagated to update the models of the T2T components. The comparison of the output of the T2S components during training against the training label may be performed by employing a loss function for determining a "loss" that is used for adjusting the T2S components during the respective training iteration. In one embodiment, said loss function measures deep feature losses or learned losses such as defined in https://arxiv.org/pdf/2001.04460.pdf. Said loss function may also be a CTC loss function applied on a wavelet space of the generated audio signals. In the same or another embodiment, the T2S components are implemented as WaveNet models, Tacotron models, or WaveGlow models.

In at least some embodiment of the present technology, the speech model and the local speech models 126, 128 and 226, 228 may be implemented as a Neural Machine Translation (NMT) system as disclosed in Learning to translate in real-time with neural machine translation (GU J. et al., ARXIV, published in April, 2017), the contents of which are incorporated herein by reference in its entirety. Illustrative examples of Neural Machine Translation (NMT) systems include Google Translate™ translation service by GOOGLE™, translation service "Speech Translation" by MICROSOFT™, and Watson™ Speech to Text, Watson™ Language Translator, and Watson™ Text to Speech services by IBM™. For instance, IBM™ provides a language translator web application that may capture audio input and streams it to the Watson™ Speech to Text service. As the input speech is transcribed, it may further be sent to the Watson™ Language Translator service to be translated into a language selected by a user. The transcribed and translated text may both be displayed by the application in real time. Each completed sentence may be sent to the Watson™ Text to Speech service to be reproduced by, for instance, speakers to the user. Additional information regarding the Google Translate™ translation service, the "Speech Translation" service by MICROSOFT™ and the translation application of IBM™, their implementations and related documentations are available at https://cloud.google.com/translate, https://azure.microsoft.com/en-us/service s/cognitive-services/speech-translation/and https://developer.ibm.com/technologies/artificial-intelligence/patterns/build-a-real-time-translation-service-with-watson-api-kit/respectively.

It should also be noted that training of a local speech model comprising one or more MLAs may involve using training datasets for the MLAs. For example, a given local speech model may use training datasets that comprise a training input signal representative of a training utterance in the first language and a training label representative of the training utterance in the second language. During a given iteration, the training label can be further compared to an output of the local speech model such that errors of translation may be backpropagated to update the model parameters.

In at least some embodiments of the present technology, the comparison of the output of the speech model during training against the training label may be performed by employing a loss function for determining a "loss" that is used for adjusting the speech model during the respective training iteration. Illustrative examples of loss functions include TRILL loss function, OpenSMILE feature extractor loss function, or audio frequency comparison.

As mentioned above, information representative of the local speech models 126, 128 and 226, 228 and/or model parameters associated therewith may be sent by/to the first and second devices 120, 220 respectively to/by the server 20 over the communication network 40.

As it will be described in greater details hereafter, in this embodiment, a first version and/or updated version of the local speech models 126, 128 and 226, 228 may be based on the speech model hosted on the server 20. As mentioned above, the local speech models 126, 128 and 226, 228 comprise MLAs (e.g., Neural Networks) that can be locally trained on their respective user device 120, 220 based on training datasets comprising signals representative of utterance in different languages received by their respective first and second devices 120, 220. The local speech models 126, 128 and 226, 228 are configured to update their model parameters based on signal received (and having been potentially decrypted) on their respective first and second devices 120, 220 to provide accurate translation of utterances. Therefore, model parameters of the local speech models 126, 128 and 226, 228 may differ as their training datasets may differ. For example, the local speech models 126, 128 and 226, 228 may be requested by the server 20 to transmit their respective updated model parameters to the server 20 over the network 40. Updated model parameters may be received from the first user device 120 on the server 20. Training of the local speech models 126, 128 and 226, 228 and transmission of updated model parameters are detailed in greater details hereafter.

The first and second electronic devices 120, 220 comprise encryption/decryption algorithms 130, 230 respectively, the encryption/decryption algorithms 130, 230 being configured to enable the first and second electronic devices 120, 220 to encrypted emitted signals and/decrypt incoming signals. It should be appreciated that encryption and/or decryption of signals by the encryption/decryption algorithms 130, 230 may be performed using techniques such as Double Ratchet algorithm, Triple Diffie-Hellman, WELGamal, Elliptic curve techniques, block ciphers such as Twofish, Blowfish, AES, DES, Camellia, and Serpent, or stream ciphers such as FISH, RC4, QUAD, Py, and SNOW. Notably, the encryption/decryption algorithms 130, 230 may be parts of the communication applications 122, 222 respectively even though they are depicted distinctly from the communication applications 122, 222 on FIG. 1.

Communication Network

The first and second electronic devices 120, 220 and a communication server 20 are communicatively coupled one to another over a communication network 40 via any wired or wireless communication link 45 including, for example, 4G, LTE, Wi-Fi, or any other suitable connection. In some non-limiting embodiments of the present technology, the communication network 40 may be implemented as the Internet. In other embodiments of the present technology, the communication network 40 can be implemented differently, such as any wide-area communication network, local-area communication network, a private communication network and the like.

How the communication links 45 between the first and second electronic devices 120, 220 and the communication server 20 is implemented will depend inter alia on how the first and second electronic devices 120, 220 and the communication server 20 are implemented. Merely as an example and not as a limitation, in those embodiments of the present technology where first and second electronic devices 120, 220 are implemented as wireless communication devices (such as smartphones), the connection 45 between said electronic devices 120, 220 and the communication server 20 can be implemented as a wireless communication link (such as but not limited to, a 3G communication network link, a 4G communication network link, Wireless Fidelity, or WiFi® for short, Bluetooth® and the like). In those examples where one of the first and second electronic devices 120, 220 is implemented as a notebook computer, the corresponding communication link can be either wireless (such as Wireless Fidelity, or WiFi® for short, Bluetooth® or the like) or wired (such as an Ethernet based connection).

The communication link 45 may be suitable for transmitting non-confidential information such as connection status of the users 100, 200, and/or any other non-confidential information.

Additionally, in this embodiment, the first and second devices 120, 220 are communicatively connected over the network 40 via an encrypted communication link 50. In some embodiments, the encrypted communication link 50 is an end-to-end encrypted communication link such that information transmitted over the communication link 50 may not be decrypted by the server 20 or another entity distinct from the first and second device 120, 220. The end-to-end encrypted communication link 50 may be used to transmit encrypted confidential signals such as signals representative of utterances of the first and second user 100, 200. In alternative embodiments, the communication link 50 is a standard encrypted communication link such that information transmitted over the communication link 50 is encrypted in transit. Using said encryption techniques, the information transmitted between the first and second device 120, 220 may be, for instance, retrieved and decrypted by the server 20. Similarly, the server 20 may be communicatively connected over the network 40 via an end-to-end encrypted communication link 55.

Communication Server

The communication server 20 may be implemented as a conventional computer server. In an example of an embodiment of the present technology, the server 20 may be implemented as a Dell™ PowerEdge™ Server running the Microsoft™ Windows Server™ operating system. Needless to say, the communication server 20 may be implemented in any other suitable hardware, software, and/or firmware, or a combination thereof. In the depicted non-limiting embodiments of the present technology, the communication server 20 is a single server. In alternative non-limiting embodiments of the present technology, the functionality of the communication server 20 may be distributed and may be implemented via multiple servers.

Generally speaking, the communication server 20 is configured to (i) generate a first version of one or more speech models, (ii) send and deploy these speech models to the first and second devices 120, 220 (hence these sent or deployed models can be called "local" speech models as they are locally executed on the respective devices), (iii) receive information indicative of the updated model parameters of the locally trained speech models and (iv) train one or more speech models on the communication server 20.

The communication server 20 may comprise one or more processors configured to manage access and interaction of the users with the communication platform. The server 20, in conjunction with the one or more processors, is configured to host or otherwise provide the speech model that may be deployed and further used by the first and second devices 120, 220 while using the communication platform. In other instances, the server 20 may manage the deployment and operation of the communication application (e.g., an App) that is provided to the first and second devices 120, 220. The communication application provides a remote operational interface for users to request, respond, or initiate a conversation with one or more users.

In this embodiment, the one or more processors are further configured to request and/or receive updated model parameters from the local speech models 126, 128 and 226, 228 to train a speech model hosted by the server 20. In this embodiment, the speech model is updated by receiving model parameters from the local speech models 126, 128 and 226, 228. It can be said that the speech model hosted by the server 20 is trained using federated learning, or "collaborative" techniques.

Broadly speaking, the speech model hosted by the server 20 may be trained using model parameters from multiple decentralized edge devices or servers, such as first and second devices 120, 220, holding locally stored module parameters. Therefore, local speech models 126, 128 and 226, 228 are trained locally with training datasets that are not transmitted to the server 20 but rather used locally for training the local speech models. Updated local speech models and/or model parameters thereof are further transmitted to the server 20. The speech model hosted on the server 20 can thus be trained on multiple training datasets contained in the first and second devices 120, 220 without explicitly receiving the training datasets. Moreover, the model parameters of the local speech models 126, 128 and 226, 228 may be transmitted by the first and second devices 120, 220 to the server 20 at some predetermined frequency, or upon determination by the first and/or second devices 120, 220 that model parameters have been substantially trained, or "updated"; namely that a number of modifications (e.g. modifications of weights and/or biases of neural network associated thereto) have reach a predetermined threshold.

Upon reception of updated model parameters of a first local speech model from a first decentralized edge device such as the first device 120, said model parameters may be combined to the speech model hosted on the server 20 and/or further transmitted to another decentralized edge device such as the second device 220. An updated version of the speech model hosted by the server 20 may thus be deployed on the first and second devices 120, 220, as it will be described in greater details herein further below.

In one embodiment, the first and/or second devices 120, 220 may transmit indications, or "losses", determined by the aforementioned loss functions associated with their respective local speech model instead of the update model parameters, such that the server 20 may use said indications for training the speech model. Therefore, the speech model may be trained on the server 20 based on said indications without the training datasets being transmitted to the server 20.

Database

A database 30 is communicatively coupled to the communication server 20. The database 30 is depicted as a separate entity from the server 20. However, it is contemplated that the database 30 may be implemented integrally with the communication server 20, without departing from the scope of the present technology. Alternatively, functionalities of the database 30 as described below may be distributed between more than one physical devices.

Generally speaking, the database 30 is configured to store data generated, retrieved and/or processed by the communication server 20 for temporary and/or permanent storage thereof. For example, the database 110 may be configured to store inter alia model parameters received by the server 20 from the first and second devices 120, 220 used for training the speech model. The database 30 may be implemented by any computer-readable medium, including RAM, ROM, flash memory, magnetic or optical disks, optical memory, or other storage media.

Figure 3:
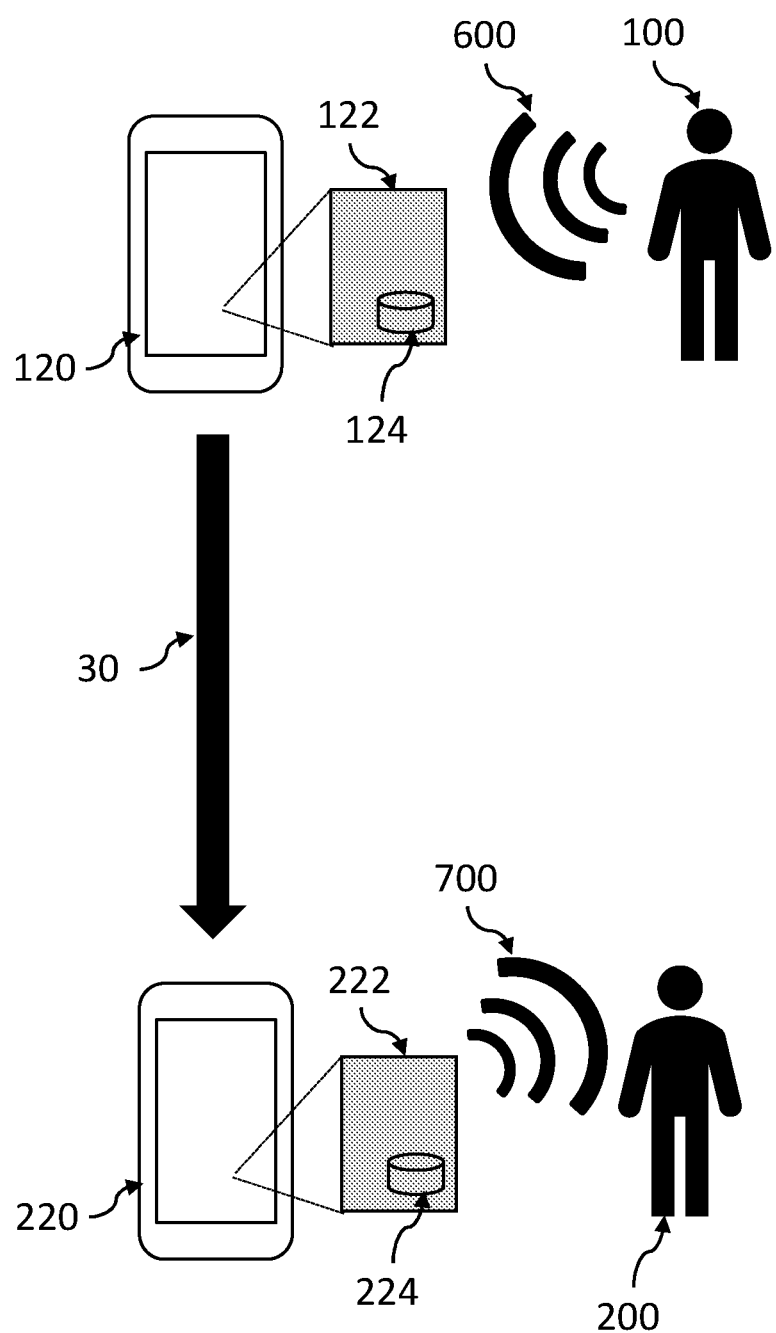
FIG. 3 is schematic representation of a communication between a first user and a second user in accordance with non-limiting embodiments of the present technology.

FIG. 3 is a schematic representation of a communication between the first user 100 and the second user 200 in accordance with an embodiment of the present technology. On the illustrative example of FIG. 3, the first user 100 may speak French and the second user 200 may speak Russian. When the first user 100 desires to communicate with the second user 200, the first user may utter in French a spoken utterance 600 The user device 120 may generate a signal representative of said French utterance 600, referred to as "French signals" (e.g. via a microphone of the user device 120). The first device 120 may execute the communication application 122 to generate a signal 30 representative of a translation of the French signal into Russian, referred to as "Russian signal" 30. The Russian signal may be encrypted by the encryption/decryption algorithm 130 and further transmit over the network 40 (see FIG. 1) to the user device 220 of the second user 200.

It should be understood that, as a content of the French utterance may be confidential, the signal representative of the utterances generated by the users of the communication platform such as the Russian signal 30 are transmitted over the end-to-end encrypted communication link 50.

The encryption/decryption algorithm 230 associated with the user device 200 may be configured to decrypt the encrypted Russian signal 30 so that the Russian signal is emitted and/or displayed by the user device 220 to the second user 200 under the form of a generated utterance 700 in Russian.

Alternatively, generation of the Russian signal based on the French signal may be performed by the communication application 222 being executed by the second device 220. In this scenario, the French signal is encrypted by the encryption/decryption algorithm 130, transmit to the user device 220 and decrypted by the encryption/decryption algorithm 230. The decrypted French signal is then translated, and a Russian signal is generated by communication application 222 to be transmitted to the second user 200 under the form of the generated utterance 700 in Russian.

Even though on FIG. 3 the communication is unidirectional (e.g. from the first user 100 to the second user 200), the communication may be bidirectional in other embodiments. Indeed, the second user 200 may also generate a written or spoken utterance in Russian to be translated and then transmitted to the first user 100 or, alternatively, transmitted to the user device 120 and then translated to be received by the first user 100. FIG. 3 depicts a unidirectional communication from the first user 100 to the second user 200 in order to lighten the present disclosure as a communication from the second user 200 to the first user 100 may be a mirrored version of the communication from the first user 100 to the second user 200.

In the embodiment of FIG. 3, the first device 120 may be configured to generate the Russian signal 30 concurrently to receiving the signal representative of the French utterance. In other words, the first device 120 may generate a translation of a first portion of the French utterance concurrently to the first user generating the French utterance. Therefore, said translation of the first portion of the French utterance may be transmitted over the end-to-end encrypted communication link 50 to be rendered by the user device 220 to the second user 200. The second user 200 thus receives a "live-translation" of the French utterance concurrently to the first user 100 generate the French utterance, as it would be in a standard phone call for instance.

FIG. 4 is a schematic representation of a content of the local speech models 126, 128 and 226, 228 in accordance with an embodiment of the present technology. The communication application 122, 222 are not depicted for clarity in FIG. 4. In the illustrative example of FIG. 4, the first user 100 may speak French and the second user 200 may speak Russian. Other languages are contemplated in alternative embodiments.

In this embodiment, the first device 120 comprises a French-to-Russian local speech model 126 configured to receive signal representative of utterances in French and generating signals representative of a Russian translation of said utterances in French. The first device 120 also comprises a Russian-to-French local speech model 128 configured to receive signal representative of utterances in Russian and generating signals representative of a French translation of said utterances in Russian.

Similarly, in this embodiment, the second device 220 comprises a French-to-Russian local speech model 226 configured to receive signal representative of utterances in French and generating signals representative of a Russian translation of said utterances in French. The second device 220 also comprises a Russian-to-French local speech model 228 configured to receive signal representative of utterances in Russian and generating signals representative of a French translation of said utterances in Russian.

The French-to-Russian local speech models 126, 226 and the Russian-to-French local speech models 128, 228 may employ MLAs to generate signals representative of translated utterances. In this embodiment, the local speech models 126, 128 may be executed by the computing unit 250 of the user device 120. Similarly, the local speech models 226, 228 may be executed by a computing unit of the user device 200 that may have features similar of the computing unit 250. Training datasets for the corresponding MLAs and a method for training said local speech models is described in greater detail hereafter.

In this embodiment, the server 20 transmits French-to-Russian local speech model 126 and the Russian-to-French local speech model 128 to the first device 100 to be further deployed in the first device 120. The server 20 also transmits the French-to-Russian local speech model 226 and the Russian-to-French local speech model 228 to the second device 200 to be further deployed in the second device 220. To do so, the server 20 may transmit respective module parameters to the first and second devices 120, 220 over the communication link 45 or the encrypted communication links 50, 55.

As illustrated on FIG. 4, a first version of the local speech models 126, 226, 128 and 228, noted "v1", may have been deployed by the server 20 on the first and second devices 120, 220 respectively. Therefore, prior being trained, the French-to-Russian local speech models 126, 226 may have identical model parameters. Similarly, first versions of the Russian-to-French local speech models 128, 228 may have identical model parameters. In some embodiment, it can be said that the server 20 transmits current versions of the local speech models 126, 226, 128 and 228 to the first and second devices 120, 220 respectively, or that the server 20 transmits a most currently updated version of the local speech models 126, 226, 128 and 228 to the first and second devices 120, 220 respectively.

In the same or another embodiment, the first device 120 may comprise only one of the local speech models 126, 128. Similarly, the second device 220 may comprise only one of the local speech models 226, 228. As a first example, the first device 120 may only comprise the French-to-Russian local speech model 126 such that a French utterance from the first user 100 may be translated in Russian. In this example, the second device 220 may only comprise the Russian-to- French local speech model 228 such that a Russian utterance from the second user 200 may be translated in French to be send to the user device 120. As a second example, the first device 120 may only comprise the Russian-to-French local speech model 128 such that a Russian utterance received from the user device 220 by the user device 120 may be translated in French. In this example, the second device 220 may only comprise the French-to-Russian local speech model 226 such that an utterance in French received from the user device 120 by the second device 220 may be translated in Russian.

It should be understood that the first and second devices 120, 220 may comprise additional or alternative local speech models for different languages, the local speech models being stored locally on the first and second devices 120, 220. For example, a set of local speech models may be sent to each of the first and second devices 120, 220 such as French-to-English local speech models, English-to-French local speech models, French-to-Italian local speech models, Italian-to-French local speech models, English-to-Italian local speech models, Italian-to-English local speech models, etc.

FIG. 5 is a flow diagram of a method 500 for generating a speech model, the speech model for generating signals representative of utterances in a first language and a second language based on respective signals representative of utterances in the second and first languages respectively according to some embodiments of the present technology. In one or more aspects, the method 500 or one or more steps thereof may be performed by a computing unit or a computer system, such as the server 20. The method 500 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

STEP 505: Transmitting a First Speech Model to the First Device

At step 505, the server 20 transmits a first speech model to the first device 120, the first speech model for locally generating by the first device 120 signals representative of utterances in the second language, namely in Russian in the examples of previously described Figures, based on signals representative of utterances in the first language, namely in French in the examples of previously described FIG. 4. More specifically, the server 20 may transmits model parameters such that an execution of the model parameters by the computing unit of the first device 120 cause a deployment of a speech model on the first device 120. Said speech model may thus be referred, upon being deployed, as a "local" speech model, such as the French-to-Russian local speech model 126. Transmission and deployment of a local speech model on the user device 120 may be performed as described in FIG. 4.

Even though the first device 120 is depicted as comprising the French-to-Russian local speech model 126 and the Russian-to-French local speech model 128 in FIG. 4, it should be understood that the first device 120 may comprise only, for instance, French-to-Russian local speech model 126, as it will become apparent from the description herein further below.

STEP 510: Transmitting a Second Local Speech Model to the Second Device

At step 510, the server 20 transmits a second speech model to the second device 220 communicatively coupled with the first device 120 by the end-to-end encrypted communication link 50 (see FIG. 1), the second speech model being configured for locally generating signals representative of utterances in the first language based on signals representative of utterances in the first language. More specifically, the server 20 may transmits model parameters such that an execution of the model parameters by the computing unit of the second device 220 cause a deployment of a speech model on the second device 220. Said speech model may thus be referred, upon being deployed, as a "local" speech model, such as the Russian-to-French local speech model 228.

Even though the second device 220 is depicted as comprising the French-to-Russian local speech model 226 and the Russian-to-French local speech model 228 in FIG. 4, it should be understood that the second device 220 may comprise only, for instance, Russian-to-French local speech model 228, as it will become apparent from the description herein further below.

STEP 515: Acquiring a Third Speech Model from the Second Device, the Third Speech Model being the Second Speech Model that has been Locally Trained on the Second Device Based on a Training Set At step 515, the server 20 is configured to acquire a third speech model from the second device 220, the third speech model being the second speech model, such as speech model 228, that has been locally trained on the second device 220 based on a training set. In this embodiment, the training set comprises a first decrypted signal and a second decrypted signal. The first decrypted signal is a given signal generated by the first device 120 based on utterance of the first user in the first language and having been encrypted by the first device 120 and decrypted by the second device 220. The second decrypted signal is an other given signal generated by the first local speech model 126 based on the given signal and having been encrypted by the first device 120 and decrypted by the second device 220, the other given signal being representative of a translated utterance of the first user 100 in the second language.

In this embodiment, the third speech model is trained to generate a training signal based on the second decrypted signal such that the training signal is similar to the first encrypted signal.

Figure 6:
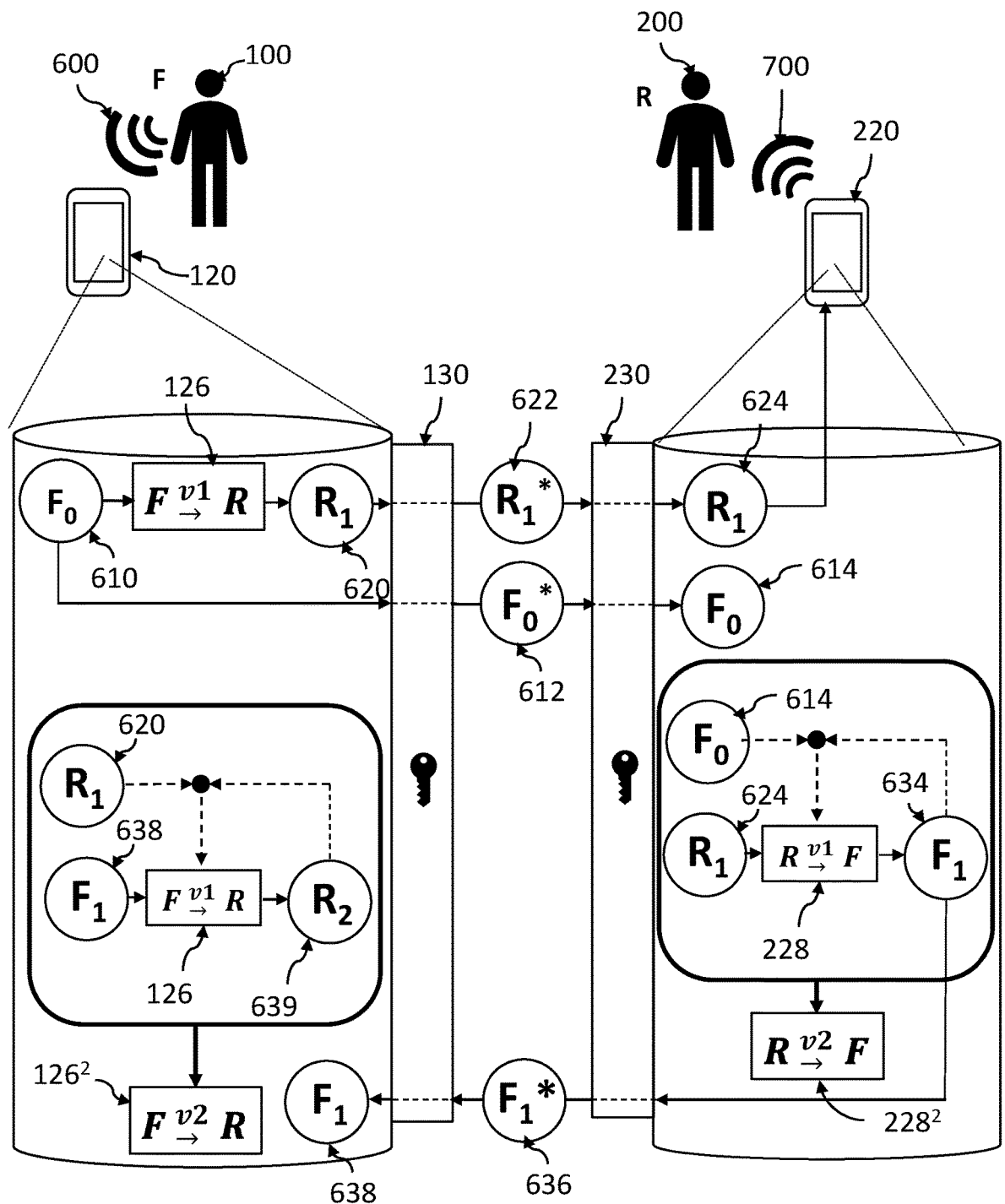
FIG. 6 illustrates transmission of signals representative of utterances of a first user to a second user for training of local speech models in accordance with non-limiting embodiments of the present technology.

FIG. 6 illustrates a representation of transmissions of signals representative of utterances between the first a second user 100, 200 for training of the local speech models in accordance with an embodiment of the present technology. The illustrative embodiment of FIG. 6 is a mere example of the present technology and does not set forth the boundaries of the present technology. In the illustrative example of FIG. 6, the first user 100 may speak French (F) and the second user 200 may speak Russian (R). Other languages may be contemplated in alternative embodiments.

In this embodiment, the first device 120 associated with the first user 100 comprises the French-to-Russian local speech model 126, and the second device 220 associated with the second user 200 comprises the Russian-to-French local speech model 228.

The first user may utter a first utterance 600 in French by, for instance, starting to utter an oral sentence in a microphone of the first device 120. The communication application (not depicted) may generate a signal 610, illustrated as "$F_0$", and representative of the first utterance 600. In other words, the first device 120 may generate the signal 610 as a waveform, or an "audio signal", representative of the utterance 600. The signal 610 may alternatively be generated by the computing unit 250 of the user device 120 or any other component suitable for generating the signal 610 based on the first utterance 600.

In this embodiment, the French-to-Russian local speech model 126 is configured to generate a signal 620, illustrated as "$R_1$" on FIG. 6, representative of a translation of the first utterance 600 based on the signal 610. The signal 620 is thus representative of an utterance in Russian.

The signal 620 may be encrypted by the encryption/decryption algorithm 130 associated with the user device 120. The encryption/decryption algorithm 130 thus generates an encrypted signal 622, represented as "$R_1*$" on FIG. 6, based on the signal 620. The signal 620 may be encrypted using known techniques such as the aforementioned encryption/decryption algorithms.

In this embodiment, the firs device 120 sends the encrypted signal 622 to the user device 220 of the second user 200 over the network 40 via the end-to-end encrypted communication link 50 (not depicted, see FIG. 1). The encrypted signal 622 may be received by the user device 220 and decrypted by the encryption/decryption algorithm 230. The encryption/decryption algorithm 230 thus generates a decrypted signal 624 based on the signal 620.

In this embodiment, the second device 220 may be configured to reproduce an utterance 700 in Russian based on the signal 624. For example, the second device 220 may use one or more speakers for reproducing the utterance 700 based on the signal 624.

In the embodiment of FIG. 6, the Russian-to-French local speech model 228 is configured to generate a signal 634, illustrated as "$F_1$" on FIG. 6, representative of a translation of the utterance in Russian embedded in the signal 624. The signal 634 is thus representative of an utterance in French.

The first device 120 may transmit the signal 610 to the user device 220 over the end-to-end encrypted communication link 50, an encrypted signal 612, represented as "$F_0*$", being generated based on the signal 610 by the encryption/decryption algorithm 130. The second device 220 receives the signal 612 and the encryption/decryption algorithm 230 generates a signal 614 based on the encrypted signal 612 and representative of the first utterance 600.

To train the Russian-to-French local speech model 228, the signal 624 may be used as a training input. Once the training input is provided to the Russian-to-French local speech model 228, the Russian-to-French local speech model 228 generates the signal 634 as an output. The second device 220 may use the signal 614, representative of the first utterance 600 originally uttered by the first user 100, as a training label against the output signal 634. It can be said that the signal 614 is representative of a "ground-truth" of the utterance of the first user 100. The second device 220 may apply a loss function for determining how different the output signal 634 is from the training label signal 614. The second device 220 may further generate a "loss" based on the loss function for adjusting the model parameters of the Russian-to-French local speech model 228.

Based on an indication of the loss function, the model parameters of the Russian-to-French local speech model 228 may be updated. More specifically, a second Russian-to-French local speech model 228$^2$, namely the third local speech model, may be generated based on an update of the model parameters of the Russian-to-French local speech model 228. It may be said that the second Russian-to-French local speech model 228$^2$ is an iterated version, noted "v2", of the Russian-to-French local speech model 228, or that the Russian-to-French local speech model 228 has been trained. In FIG. 6, the Russian-to-French local speech model 228 and the second Russian-to-French local speech model 228$^2$ are separately depicted. However, it should be understood that the updated model parameters may be directly implemented in the Russian-to-French local speech model 228, thereby updating the initial version "v1" into the second Russian-to-French local speech model 228$^2$.

Therefore, in this illustrative embodiment, the first decrypted signal of the training set corresponds to the signal 614 and the second decrypted signal of the training set corresponds to the signal 624. The Russian-to-French local speech model 228 is thus locally trained on the second device 220. The second device 220 may further transmits the model parameters of the Russian-to-French local speech model 228 to the server 20 for training of the speech model hosted thereby, the speech model being thus trained according to the aforementioned federated learning techniques.

Alternatively, the second device 220 may transmit the indications of the loss function, representative of a difference between the signal 634 and the signal 614, to the server 20. Therefore, in some embodiments, an output of the loss function, such as the aforementioned "loss" representative of an output of the loss function resulting from inputting the training label and the output signal 634, is transmitted by the second device 220 to the server 20. The server 20 may further train the speech model using said indications and update its model parameters based on said indication. The server 20 may subsequently transmits and deploy an updated version of the speech model on the first and second devices 120, 220.

It should be understood that the local speech model 126 may be similarly trained, without limitation, in a mirrored communication between the first and second users 100, 200 where the second user 200 utters an utterance in Russian to be translated and transmitted to the first user 100.

Optionally, in this embodiment, the French-to-Russian local speech model 126 of the first device 120 may be trained. To do so, the signal 634 may be encrypted by the encryption/decryption algorithm 230 and transmitted by the second device 220 to the first device 120. The encryption/decryption algorithm 230 thus generates an encrypted signal 636, represented as "$F_1*$" on FIG. 6, based on the signal 634. In this embodiment, the second device 220 sends the encrypted signal 636 to the first device 120 of the first user 100 over the network 40 via the end-to-end encrypted communication link 50 (not depicted, see FIG. 1). The encrypted signal 636 may be received by the user device 120 and decrypted by the encryption/decryption algorithm 130. The encryption/decryption algorithm 130 thus generates a decrypted signal 638 based on the signal 636. The decrypted signal 638 is represented as "$F_1$" on FIG. 6 as it is assumed, in this illustrative embodiment, that the signal 634 and the decrypted signal 638 are identical, namely containing a same information.

To train the French-to-Russian local speech model 126, the signal 638 may be used as a training input. Once the training input is provided to the French-to-Russian local speech model 126, the French-to-Russian local speech model 126 generates a signal 639 representative of an utterance in Russian noted "$R_2$" as an output. The first device 120 may use the signal 620, representative of the first utterance 600 originally uttered by the first user 100 translated in Russian, as a training label against the output signal 639. It can be said that the signal 620 is representative of a "ground-truth" of a translation of the utterance of the first user 100 for this training set. The first device may apply a loss function for determining how different the output signal 639 is from the training label signal 620. The first device may further generate a "loss" based on the loss function for adjusting the model parameters of the French-to-Russian local speech model 126.

Based on an indication of the loss function, the model parameters of the French-to-Russian local speech model 126 may be updated. It can be said that a second French-to-Russian local speech model 126$^2$ may be generated following the described training iteration based on an update of the model parameters of the French-to-Russian local speech model 126. It may be said that the second French-to-Russian local speech model 126$^2$ is an iterated version, noted "v2", of the French-to-Russian local speech model 126 and/or that the French-to-Russian local speech model 126 has been trained. In FIG. 6, the French-to-Russian local speech model 126 and the second French-to-Russian local speech model 126$^2$ are separately depicted. However, it should be understood that the updated model parameters may be implemented in the French-to-Russian local speech model 126, thereby updating the initial version "v1" into the second French-to-Russian local speech model 126$^2$.

The French-to-Russian local speech model 126 is thus locally trained on the first device 120. The first device 120 may further transmits information representative of the French-to-Russian local speech model 126 (including the model parameters thereof, for example) to the server 20. The server 20 may then make use of this information for training a speech model hosted thereby according to the aforementioned federated learning techniques.

Alternatively, the first device 120 may transmit the indications of the loss function, representative of a difference between the signal 639 and the signal 620, to the server 20. Therefore, in some embodiments, an output of the loss function, such as the aforementioned "loss" representative of an output of the loss function resulting from inputting the training label and the local speech model output signal 639, may be transmitted by the first device 120 to the server 20. The server 20 may further train the speech model using said indications and update its model parameters based on said indication. The server 20 may subsequently transmits and deploy an updated version of the speech model on the first and second devices 120, 220.

In some embodiments, the French-to-Russian local speech model 126 and the Russian-to-French local speech model 228 are concurrently trained and updated. In some other embodiments, the French-to-Russian local speech model 126 is trained and updated alone. In yet some other embodiments, the Russian-to-French local speech model 228 is trained and updated alone.

It should be understood that signals represented in FIG. 6 (and FIGS. 7 and 8 described herein further below) may represent portions of sentences, or translations of said portions, formed by the first user 100. Indeed, the aforementioned transmissions of signals and translations of utterances embedded in said signals by the local speech models 126, 128 and 226, 228 may be performed concurrently to receiving the first utterance 600 by the first user 100.

STEP 520: Generating the Speech Model by Combining the Second Speech Model with the Third Speech Model At step 520, the server 20 is configured to generate the speech model by combining the second speech model with the third speech model. For example, the server 20 may cause the database 30 to store the second local speech model. More specifically, the database may store model parameters of a first version of the Russian-to-French local speech model 228. Upon an update of the Russian-to-French local speech model 228, the server 20 may cause the second device 220 to transmit, over the encrypted links 50, 55 or over the communication link 45, the updated model parameters, said updated model parameters corresponding to said third speech model. The server 20 may thus generate a speech model based on model parameters of the second speech model and the third speech model. Therefore, it can be said that the speech model hosted by the server 20 is trained using federated learning, or "collaborative" techniques, by retrieving model parameters of locally trained speech models such as the local speech models 126, 128 and 226, 228.

Figure 7:
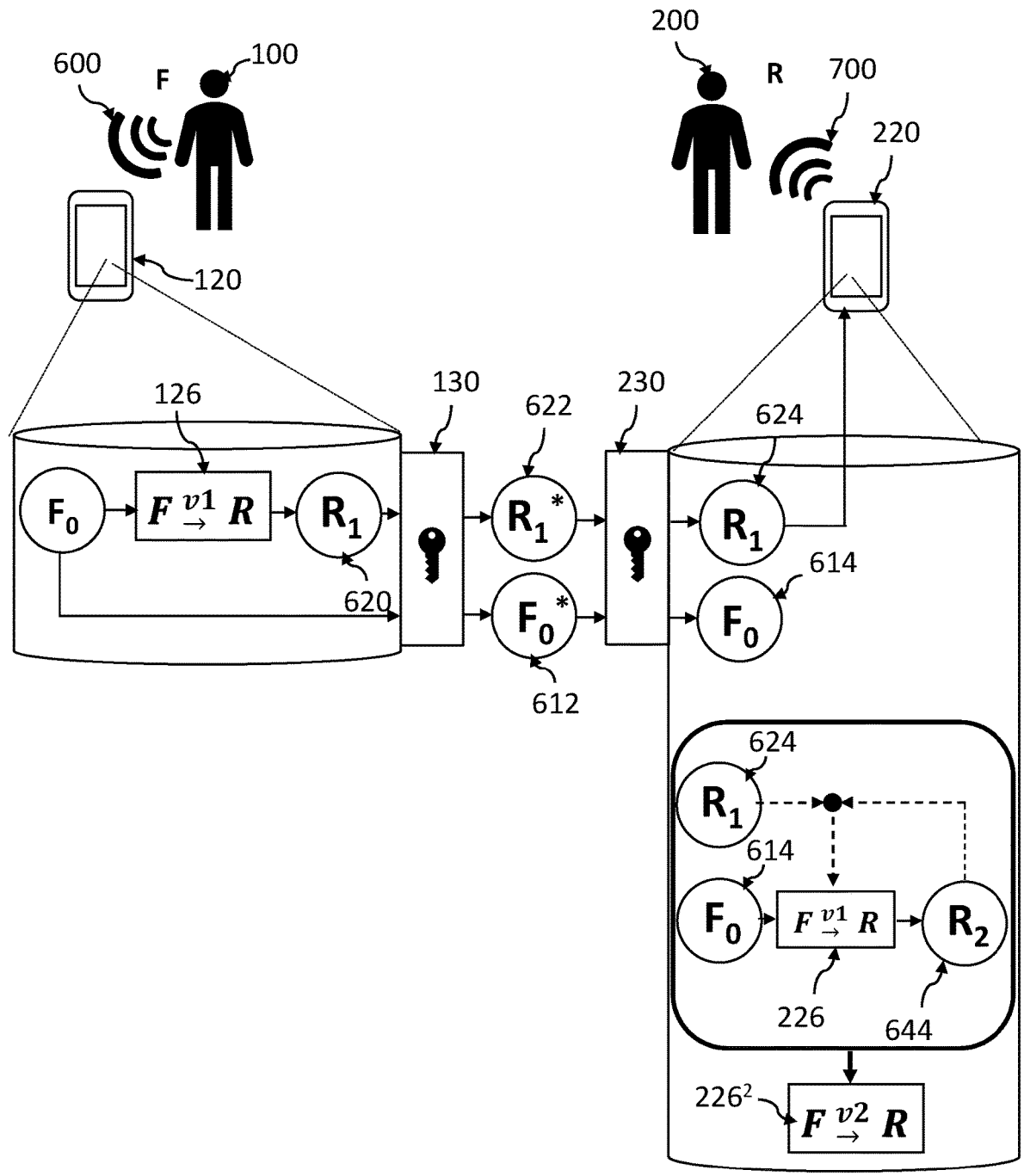
FIG. 7 illustrates transmission of signals representative of utterances of a first user to a second user for training of local speech models in accordance with another embodiment of the present technology.
Figure 8:
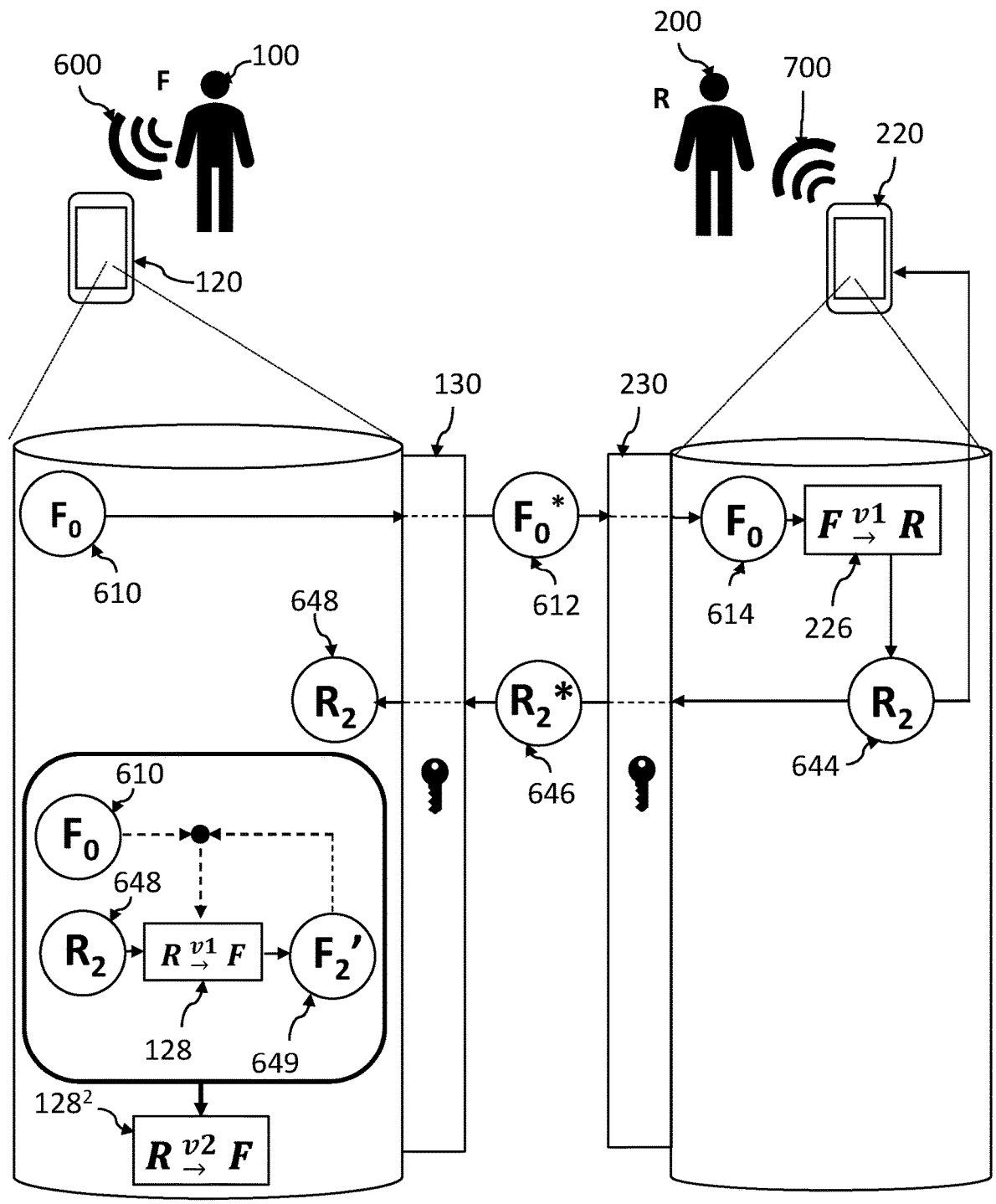
FIG. 8 illustrates transmission of signals representative of utterances of a first user to a second user for training of local speech models in accordance with yet another embodiment of the present technology.

Other embodiments of the present technology are presented for training the local speech models 126, 128 and 226, 228 with the in the FIGS. 7 and 8.

FIG. 7 illustrates transmissions of signals representative of utterances of the first a second user 100, 200 for training of the local speech models in accordance with another embodiment of the present technology. The illustrative embodiment of FIG. 7 is a mere example of the present technology and does not set forth the boundaries of the present technology. In the illustrative example of FIG. 7, the first user 100 may speak French (F) and the second user 200 may speak Russian (R). Other languages may be contemplated in alternative embodiments.

In this embodiment, the first device 120 associated with the first user 100 comprises the French-to-Russian local speech model 126, and the second device 220 associated with the second user 200 comprises the French-to-Russian local speech model 226. In an embodiment, the French-to-Russian local speech models 126, 226 may have identical model parameters as they may have been deployed by the server 20 as a first version of French-to-Russian local speech models 126, 226, noted "v1".

The signals 614 and 624 in FIG. 7 are generated similarly to a generation of signals 614 and 624 in FIG. 6 as described herein above.

In the embodiment of FIG. 7, the French-to-Russian local speech model 226 is configured to generate a signal 644, represented as "R$_2$" on FIG. 7, representative of the utterance of the signal 614 translated in Russian. The signal 644 is thus representative of an utterance in Russian.

To train French-to-Russian local speech model 226, the signal 614 may be used as a training input. Once the training input is provided to the French-to-Russian local speech model 226, the French-to-Russian local speech model 226 generates the signal 644 as an output. The second device 220 may use the signal 624 representative of a translation of the initial utterance 600 of the first user 100 by the French-to-Russian local speech model 126 as a training label against the output signal 644. It can be said that the signal 624 is representative of a "ground-truth" of the utterance 600 of the first user 100. The second device may apply a loss function for determining how different the output signal 644 is from the training label signal 624. The second device 220 may further generate a "loss" based on the loss function for adjusting the model parameters of the French-to-Russian local speech model 226.

Based on an indication of the loss function, the model parameters of the French-to-Russian local speech model 226 may be updated. More specifically, a second French-to-Russian local speech model 226$^2$ may be generated based on an update of the model parameters of the French-to-Russian local speech model 226. It may be said that the second French-to-Russian local speech model 226$^2$ is an iterated version, noted "v2", of the French-to-Russian local speech model 226 or that the French-to-Russian local speech model 226 has been trained. In FIG. 7, the French-to-Russian local speech model 226 and the second French-to-Russian local speech model 226² are separately depicted. However, it should be understood that the updated model parameters may be directly implemented in the French-to-Russian local speech model 226, thereby updating the initial version "v1" into the second French-to-Russian local speech model 226².

The French-to-Russian local speech model 226 is thus locally trained on the second device 220. The second device 220 may further transmits the model parameters of the French-to-Russian local speech model 226 to the server 20 for training of the speech model hosted thereby, the speech model being thus trained according to the aforementioned federated learning techniques.

Alternatively, the second device 220 may transmit the indications of the loss function, representative of a difference between the signal 644 and the signal 624, to the server 20. Therefore, in some embodiments, an output of the loss function, such as the aforementioned "loss" representative of an output of the loss function resulting from inputting the training label signal 624 and the output signal 644, is transmitted by the second device 220 to the server 20. The server 20 may further train the speech model using said indications and update its model parameters based on said indication. The server 20 may subsequently transmits and deploy an updated version of the speech model on the first and second devices 120, 220.

FIG. 8 illustrates transmissions of signals representative of utterances of the first a second user 100, 200 for training of the local speech models in accordance with another embodiment of the present technology. The illustrative embodiment of FIG. 8 is a mere example of the present technology and does not set forth the boundaries of the present technology. In the illustrative example of FIG. 8, the first user 100 may speak French (F) and the second user 200 may speak Russian (R). Other languages may be contemplated in alternative embodiments.

In this embodiment, the first device 120 associated with the first user 100 comprises the Russian-to-French local speech model 128, and the second device 220 associated with the second user 200 comprises the French-to-Russian local speech model 226.

The signals 614 in FIG. 8 is generated similarly to a generation of signal 614 in FIG. 6 as described herein above.

In this embodiment, the French-to-Russian local speech model 226 is configured to generate a signal 644, represented as "R₂" on FIG. 8, representative of the first utterance translated in Russian. The signal 644 is thus representative of an utterance in Russian.

In this embodiment, the second device 220 may be configured to reproduce an utterance 700 in Russian based on the signal 644. For example, the second device 220 may use one or more speakers for reproducing the utterance 700 based on the signal 644. A correctness of, for instance, the real estate lexicon of the utterance 700 thus depends on a local training of the French-to-Russian local speech model 126 (in the case where loss of information due to transmission and encryption/decryption is ignored).

In this embodiment, the encryption/decryption algorithm 230 may further encrypt the signal 644 so that the second device 220 may transmit said encrypted signal. The encryption/decryption algorithm 230 thus generates an encrypted signal 646, represented as "F₂*" on FIG. 8, based on the signal 644.

In this embodiment, the second device 220 sends the encrypted signal 646 to the first device 120 over the network 40 via the end-to-end encrypted communication link 50 (not depicted, see FIG. 1). The encrypted signal 646 may be received by the user device 120 and decrypted by the encryption/decryption algorithm 130. The encryption/decryption algorithm 130 thus generates a decrypted signal 648 based on the signal 646. The decrypted signal 648 is represented as "R₂" on FIG. 8 as it is assumed, in this illustrative embodiment, that the signal 644 and the decrypted signal 648 are identical, namely containing a same information.

The Russian-to-French local speech model 128 is configured to generate a signal 649, represented as "F₂'" on FIG. 8, representative of the utterance represented by the signal 648 translated in French. The signal 649 is thus representative of an utterance in French.

To train the Russian-to-French local speech model 128, the signal 648 may be sued as a training input. Once the training input is provided to the Russian-to-French local speech model 128, the Russian-to-French local speech model 128 generates the signal 649 as an output. The first device 120 may use the signal 610, representative of a translation of the initial utterance 600 of the first user 100, as a training label against the output signal 649. It can be said that the signal 610 is representative of a "ground-truth" of the utterance of the first user 100. The first device 120 may apply a loss function for determining how different the output signal 649 is from the training label signal 610. The first device 120 may further generate a "loss" based on the loss function for adjusting the model parameters of the Russian-to-French local speech model 128.

Based on an indication of the loss function, the model parameters of the Russian-to-French local speech model 128 may be updated. More specifically, a second Russian-to-French local speech model 128² may be generated based on an update of the model parameters of the Russian-to-French local speech model 128. It may be said that the second Russian-to-French local speech model 128² is an iterated version, noted "v2", of the Russian-to-French local speech model 128 or that the Russian-to-French local speech model 128 has been trained. In FIG. 8, the Russian-to-French local speech model 128 and the second Russian-to-French local speech model 128² are separately depicted. However, it should be understood that the updated model parameters may be directly implemented in the Russian-to-French local speech model 128, thereby updating the initial version "v1" into the second Russian-to-French local speech model 128².

The Russian-to-French local speech model 128 is thus locally trained on the first device 120. The first device 120 may further transmits the model parameters of the Russian-to-French local speech model 128 to the server 20 for training of the speech model hosted thereby, the speech model being thus trained according to the aforementioned federated learning techniques.

Alternatively, the first device 120 may transmit the indications of the loss function, representative of a difference between the output signal 649 and the training label signal 610, to the server 20. Therefore, in some embodiments, an output of the loss function, such as the aforementioned "loss" representative of an output of the loss function resulting from an input of the training label signal 610 and the output signal 649, is transmitted by the second device 220 to the server 20. The server 20 may further train the speech model using said indications and update its model parameters based on said indication. The server 20 may subsequently transmits and deploy an updated version of the speech model on the first and second devices 120, 220

In other embodiments, the first and second devices 120, 220 may comprise local speech modules for providing translations in more than two natural languages. For instance, the first device 120 may comprise a French-to-English local speech model, an English-to-German local speech model and a German-to-French local speech model. In this illustrative example, the first user may utter a first utterance in French. The French-to-English, English-to-German and German-to-French local speech models may provide signals in series such that the French-to-English local speech model provides a signal representative of a second utterance in English based on the first utterance in French, the English-to-German local speech model provides signal representative of a third utterance in German based on the second utterance in English, and, eventually, the German-to-French local speech model provides signal representative of a fourth utterance in French based on the third utterance in German. The German-to-French local speech model may thus be locally trained using a training dataset comprising: a signal representative of the third utterance in German as a training input, and the signal representative of the first utterance in French as a training label to be compared with the signal representative of the fourth utterance in French outputted by the German-to-French local speech model.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of generating a speech model, the speech model for generating signals representative of utterances in a first language and a second language based on respective signals representative of utterances in the second and first languages respectively, the speech model being hosted by a server communicatively coupled with a first device associated with a first user and a second device associated with a second user, the method executable by the server, the method comprising:
    transmitting, by the server, a first speech model to the first device, the first speech model for locally generating by the first device signals representative of utterances in the second language based on signals representative of utterances in the first language;
    transmitting, by the server, a second speech model to the second device, the second speech model for locally generating by the second device signals representative of utterances in the first language based on signals representative of utterances in the second language,
        the first device being communicatively coupled with the second device by an encrypted communication link;
    acquiring, by the server, a third speech model from the second device, the third speech model being the second speech model that has been locally trained on the second device based on a training set, the training set including:
        a first decrypted signal being a given signal generated by the first device based on utterance of the first user in the first language and having been encrypted by the first device and decrypted by the second device,
        a second decrypted signal being another given signal generated by the first speech model based on the given signal and having been encrypted by the first device and decrypted by the second device, the other given signal being representative of a translated utterance of the first user in the second language,
        the third speech model having been trained to generate a training signal based on the second decrypted signal such that the training signal is similar to the first encrypted signal; and
    locally generating, by the server, the speech model by combining the second speech model with the third speech model.

2. The method of claim 1, wherein the method further comprises:
    acquiring, by the server, a fourth speech model from the first device, the fourth speech model being the first speech model that has been locally trained on the first device based on another training set, the other training set including:
        a third decrypted signal being the training signal generated by the third speech model on the second device and having been encrypted by the second device and decrypted by the first device; and
        the given signal generated by the first device based on the utterance of the first user in the first language;
        the fourth speech model having been trained to generate another training signal based on the third decrypted signal such that the other training signal is similar to the given signal; and
    locally generating, by the server, another speech model by combining the first speech model with the fourth speech model.

3. The method of claim 1, wherein the method further comprises:
    transmitting, by the server, the first speech model to the second device, the first speech model for locally generating by the second device signals representative of utterances in the second language based on signals representative of utterances in the first language,
    acquiring, by the server, a fourth speech model from the second device, the fourth speech model being the first speech model that has been locally trained on the second device based on another training set, the other training set including the first decrypted signal and the second decrypted signal,
        the fourth speech model having been trained to generate another training signal based on the first decrypted signal such that the other training signal is similar to the second encrypted signal; and
    locally generating, by the server, another speech model by combining the first speech model with the fourth speech model.

4. The method of claim 1, wherein the encrypted communication link is an end-to-end encrypted communication link.

5. The method of claim 1, wherein the locally generating the other speech model by combining the second speech model with the third speech model comprises employing, by the server, a federated learning algorithm.

6. A server for generating a speech model, the speech model for generating signals representative of utterances in a first language and a second language based on respective signals representative of utterances in the second and first languages respectively, the server being configured to host the speech model, the server being communicatively coupled with a first device associated with a first user and a second device associated with a second user, the server being configured to:
- transmit a first speech model to the first device, the first speech model for locally generating by the first device signals representative of utterances in the second language based on signals representative of utterances in the first language;
- transmit a second speech model to the second device, the second speech model for locally generating by the second device signals representative of utterances in the first language based on signals representative of utterances in the second language,
  - the first device being communicatively coupled with the second device by an encrypted communication link;
- acquire a third speech model from the second device, the third speech model being the second speech model that has been locally trained on the second device based on a training set, the training set including:
  - a first decrypted signal being a given signal generated by the first device based on utterance of the first user in the first language and having been encrypted by the first device and decrypted by the second device,
  - a second decrypted signal being another given signal generated by the first speech model based on the given signal and having been encrypted by the first device and decrypted by the second device, the other given signal being representative of a translated utterance of the first user in the second language,
  - the third speech model having been trained to generate a training signal based on the second decrypted signal such that the training signal is similar to the first encrypted signal; and
- locally generate the speech model by combining the second speech model with the third speech model.

7. The server of claim 6, wherein the server is further configured to:
- acquire a fourth speech model from the first device, the fourth speech model being the first speech model that has been locally trained on the first device based on another training set, the other training set including:
  - a third decrypted signal being the training signal generated by the third speech model on the second device and having been encrypted by the second device and decrypted by the first device; and
  - the given signal generated by the first device based on the utterance of the first user in the first language;
- the fourth speech model having been trained to generate another training signal based on the third decrypted signal such that the other training signal is similar to the given signal; and
- locally generate another speech model by combining the first speech model with the fourth speech model.

8. The server of claim 6, wherein the server is further configured to:
- transmit the first speech model to the second device, the first speech model for locally generating by the second device signals representative of utterances in the second language based on signals representative of utterances in the first language,
- acquire a fourth speech model from the second device, the fourth speech model being the first speech model that has been locally trained on the second device based on another training set, the other training set including the first decrypted signal and the second decrypted signal, the fourth speech model having been trained to generate another training signal based on the first decrypted signal such that the other training signal is similar to the second encrypted signal; and
- locally generate another speech model by combining the first speech model with the fourth speech model.

9. The server of claim 6, wherein the encrypted communication link is an end-to-end encrypted communication link.

10. The server of claim 6, wherein the server employs a federated learning algorithm to locally generate the other speech model by combining the second speech model with the third speech model.

11. A method of generating a speech model, the speech model for generating signals representative of utterances in a first language and a second language based on respective signals representative of utterances in the second and first languages respectively, the speech model being hosted by a server communicatively coupled with a first device associated with a first user and a second device associated with a second user, the method executable by the server, the method comprising:
- transmitting, by the server, a first speech model to the first device, the first speech model for locally generating by the first device signals representative of utterances in the second language based on signals representative of utterances in the first language;
- transmitting, by the server, a second speech model to the second device, the second speech model for locally generating by the second device signals representative of utterances in the first language based on signals representative of utterances in the second language,
  - the first device being communicatively coupled with the second device by an encrypted communication link;
- acquiring, by the server, an indication of a loss function from the second device, the indication having been generated based on a comparison of:
  - a first decrypted signal being a given signal generated by the first device based on utterance of the first user in the first language and having been encrypted by the first device and decrypted by the second device, and
  - a training signal generated by the second speech model based on a second decrypted signal, the second decrypted signal being another given signal generated by the first speech model based on the given signal and having been encrypted by the first device and decrypted by the second device, the other given signal being representative of a translated utterance of the first user in the second language,
- locally training, by the server, at least one of the first speech model and the second speech model based on the indication of the loss function, thereby generating the speech model.

12. The method of claim 11, wherein the method further comprises:
- acquiring, by the server, an indication of a loss function from the first device, the indication of a loss function from the first device having been generated based on a comparison of:

a third decrypted signal being the training signal generated by a third speech model on the second device and having been encrypted by the second device and decrypted by the first device; and the given signal generated by the first device based on the utterance of the first user in the first language; and locally training, by the server, at least one of the first speech model and the second speech model based on the indication of the loss function from the first device, thereby generating the speech model.

13. The method of claim 11, wherein the method further comprises:

transmitting, by the server, the first speech model to the second device, the first speech model for locally generating by the second device signals representative of utterances in the second language based on signals representative of utterances in the first language, acquiring, by the server, an indication of a loss function from the second device, the indication having been generated based on a comparison of the first decrypted signal and the second decrypted signal, locally training, by the server, the first speech model based on the indication of the loss function from the first device, thereby generating the speech model.

14. The method of claim 11, wherein the encrypted communication link is an end-to-end encrypted communication link.

15. The method of claim 14, wherein the first device and the second device are configured to execute an end-to-end encryption algorithm.

\* \* \* \* \*